United States Patent [19]
Kuwajima

[11] Patent Number: 5,650,888
[45] Date of Patent: Jul. 22, 1997

[54] MAGNETIC RECORDING AND/OR REPRODUCING APPARATUS HAVING TAPE TRANSPORT MECHANISM WITH CAPSTAN AND ROLLER ARRANGEMENT

[75] Inventor: Hideki Kuwajima, Kyoto-fu, Japan

[73] Assignee: Matsushita Electric Industrial Co., Ltd., Osaka-fu, Japan

[21] Appl. No.: 414,302

[22] Filed: Mar. 31, 1995

[30] Foreign Application Priority Data

| Apr. 20, 1994 | [JP] | Japan | 6-081537 |
| Sep. 30, 1994 | [JP] | Japan | 6-236724 |
| Dec. 2, 1994 | [JP] | Japan | 6-299492 |
| Dec. 2, 1994 | [JP] | Japan | 6-299493 |

[51] Int. Cl.$^6$ .................................... G11B 5/027
[52] U.S. Cl. .................. 360/85; 360/95; 360/96.2
[58] Field of Search ............... 360/85, 95, 96.2; 242/354.1

[56] References Cited

FOREIGN PATENT DOCUMENTS 2285544 11/1990 Japan ................. 360/36.2

Primary Examiner—A. J. Heinz
Attorney, Agent, or Firm—Wenderoth, Lind & Ponack

[57] ABSTRACT

A magnetic recording and/or reproducing apparatus is operable with a tape cassette including spaced apart tape supply and take-up reels and a length of magnetic recording tape having its opposite ends anchored to the tape supply and take-up reels, respectively. The apparatus includes a head carrier carrying at least one magnetic transducer head; first and second hubs adapted to be engaged with the tape supply and take-up reels, respectively, when the tape cassette is loaded in the apparatus; a guide mechanism operable, when the tape cassette is loaded in the apparatus with the tape supply and take-up reels engaged with the first and second hubs, to selectively draw and withdraw a first tape portion of the length of magnetic recording tape extending between the tape supply and take-up reels out of and into the tape cassette to thereby bring that first tape portion to an operative position, at which the length of magnetic recording tape is held in sliding contact with the head carrier, and to a withdrawn position at which the first tape portion is accommodated within the tape cassette, respectively, and a tape transport mechanism.

9 Claims, 17 Drawing Sheets

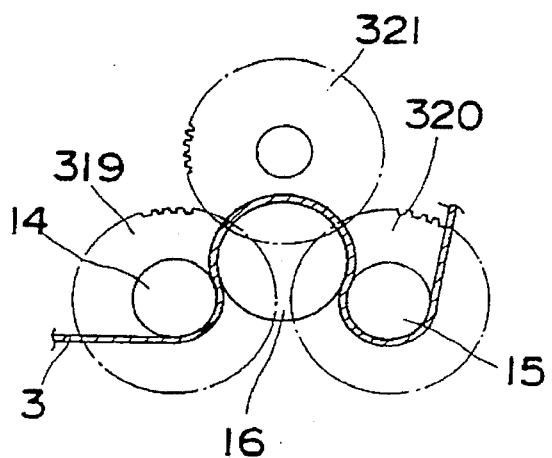
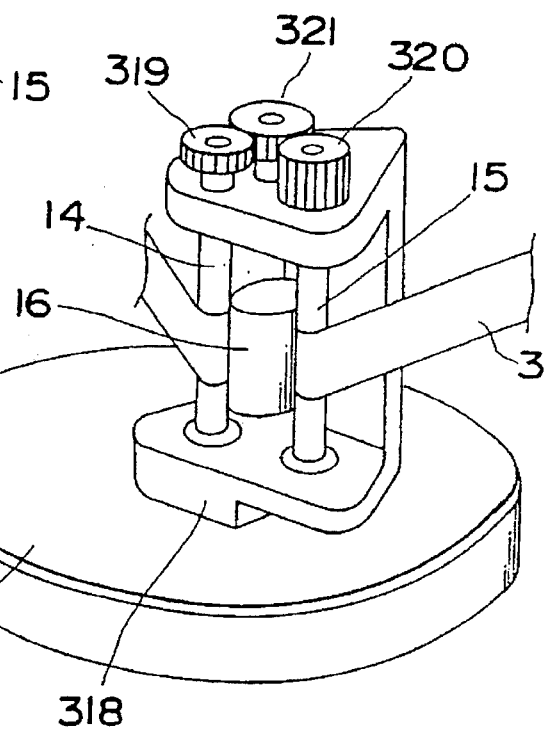
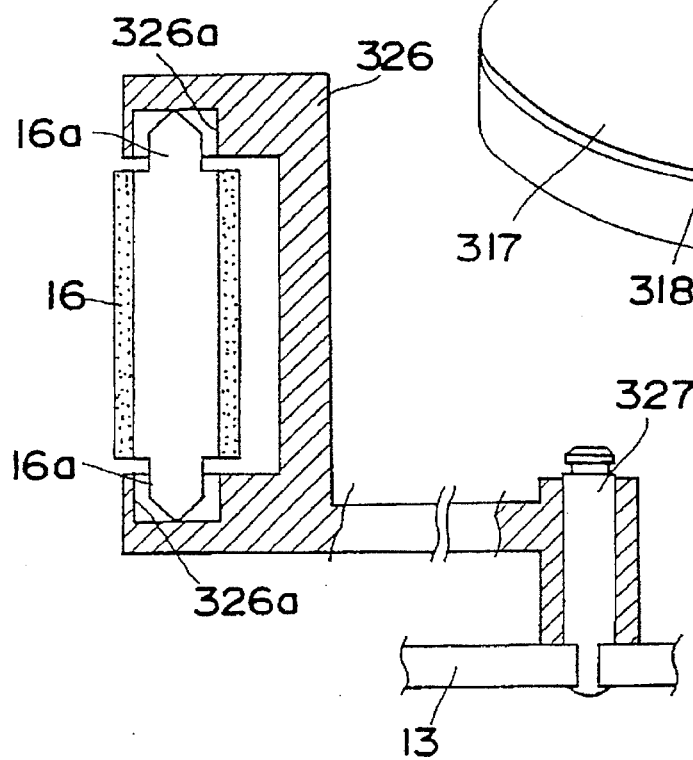

|  |  | Ring gear | Sun gear | Planetary gear | Link |
|---|---|---|---|---|---|
| (1) | (a) Simultaneous rotation | 1 | 1 | 1 | 1 |
| (2) | (b) Normal rotation | 1 | $-z1/z2$ | $-z1/z3$ | 0 |
| (3) | (a)+n·(b) | $1+n$ | $1-n \cdot z1/z2$ | $1+n \cdot z1/z3$ | 1 |

MAGNETIC RECORDING AND/OR REPRODUCING APPARATUS HAVING TAPE TRANSPORT MECHANISM WITH CAPSTAN AND ROLLER ARRANGEMENT

BACKGROUND OF THE INVENTION

1. Field of the Invention

The present invention generally relates to a magnetic recording and/or reproducing apparatus operable with a tape cassette and, more particularly, to the magnetic recording and/or reproducing apparatus of a type provided with a novel tape transport mechanism for transporting a length of magnetic recording tape from a supply reel to a take-up reel within the tape cassette by way of a head carrier.

2. Description of the Prior Art

In manufacturing the magnetic recording and/or reproducing apparatus, hereinafter referred to as a video tape player, efforts have been made to reduce the cost necessary to manufacture it in order for it to be assembled in a compact size having a light-weight feature. However, because of the nature of one or more component parts of the conventional video tape players, reduction in cost is limited.

By way of example, the conventional video tape player makes use of a complicated tape transport mechanism for driving a length of magnetic recording tape from one reel to another with the tape cassette. This tape transport mechanism used in the conventional video tape player includes a motor-coupled capstan and a pinch roller urging the length of magnetic recording tape against the capstan so that a rotary driving force exerted by the capstan can be transmitted to the length of magnetic recording tape to allow the latter to travel along a predetermined tape transport path. Also, in order for one of the reels within the tape cassette to be driven at a predetermined torque for taking up the length of magnetic recording tape driven by the capstan, the conventional video tape player makes use of a complicated clutch mechanism for controlling rotation of the reel. The details of the conventional video tape player now under discussion will be described with particular reference to FIG. 33 which schematically illustrates it as viewed from above.

Referring to FIG. 33, the standard tape cassette of a generally rectangular configuration is generally identified by 1 and includes a supply reel 2 and a take-up reel 18, both rotatably accommodated therein, and a length of magnetic recording tape 3 having its opposite ends anchored to the supply and take-up reels 2 and 18, respectively. As is well known to those skilled in the art, the tape cassette 1 has a pivotally supported side lid which is normally closed, but may be opened when the tape cassette loaded into the video tape player is set in an operative position. The tape cassette 1 also includes tape guide rollers 4a and 4b and tape guide rollers 4c, 4d and 4e rotatably positioned inside the tape cassette adjacent opposite ends of the pivotally supported side lid so that a portion of the length of magnetic recording tape 3 between the supply and take-up reels 2 and 18 may be guided so as to extend in the vicinity of and along the pivotally supported side lid.

The video tape player operable with this type of the tape cassette 1 comprises a head carrier, for example, a rotary cylinder 7 around which that portion of the magnetic recording tape 3 when drawn out from the tape cassette 1 is turned a predetermined angle so that information can be reproduced from or recorded on the magnetic recording tape 3 by means of one or more magnetic recording and/or reproducing heads carried thereby. In the illustrated video tape player, the rotary cylinder 7 makes use of four magnetic transducing heads 203a, 203b, 203c and 203d carried thereby for rotation together therewith, each neighboring members of which are spaced 90° from each other about the axis of rotation of the rotary cylinder 7.

When the tape cassette 1 is loaded in the video tape player and is subsequently set in the operative position, that portion of the magnetic recording tape 3 is turned around the rotary cylinder 7 and is transported from the supply reel 2 towards the tape-up reel 18 along a predetermined tape transport path by means of a tape transport mechanism including a motor-coupled capstan 213 and a rubber-lined pinch roller 215. The tape transport mechanism is so operated that while the motor-coupled capstan 213 is driven in one direction, the rubber-lined pinch roller 215 is brought in position to urge a portion of the magnetic recording tape 3, intervening therebetween, to contact the capstan 213 so as to permit the latter to drive the magnetic recording tape 3 in one direction towards the take-up reel 18.

The prior art video tape player also comprises a full eraser head 211, disposed along the tape transport path at a location on a trailing side of the rotary cylinder 7 with respect to the direction of travel of the magnetic recording tape 3 from the supply reel 2 towards the take-up reel 18, for erasing a video signal on the length of magnetic recording tape 3 during a recording mode of the video tape player; an audio eraser head 210 and an audio control head 209 disposed along the tape transport path at a location on a leading side of the rotary cylinder 7. The audio eraser head 210 is operable to erase an audio signal on the length of magnetic recording tape 3 during the recording mode of the video tape prayer, and the audio control head 209 is operable to record an audio signal and a control signal on opposite longitudinal side edge portions of the length of magnetic recording tape 3.

The tape transport path referred to above is defined by not only the position of the rotary cylinder 7, but also a plurality of movable guide posts 204a, 204b, 203c, 204d and 204e and a plurality of movable inclined guide posts 205a and 205b as is well known to those skilled in the art. These guide posts 204a to 204d, 205a and 205b are positioned at a retracted position, shown by the phantom lines, so long as the tape cassette 1 has not yet been received in a cassette receiving chamber of the video tape player or the tape cassette 1 has not yet been set in the operative position even though the tape cassette 1 is received within the cassette receiving chamber. However, when the tape cassette 1 received within the cassette receiving chamber of the video tape player is set in the operative position, these guide posts are moved from the retracted position towards a tape path defining position shown by the solid lines by and in a manner well known to those skilled in the art in response to a signal from a cassette detector switch (not shown) with that portion of the magnetic recording tape 3 consequently turned around the rotary cylinder 7.

The capstan 213 is drivingly coupled with a drive motor 214 and is cooperable with the pinch roller 215 to drive the length of magnetic recording tape 3 in one direction along the tape transport path at a predetermined speed when the video tape player is operated in a recording mode or a reproducing mode.

Also, so long as the tape cassette 1 within the cassette receiving chamber is set in the operative position, a gear integral with a hub then coaxially connected with the supply reel 18 is engaged with a take-up drive gear 21. This take-up drive gear 21 is adapted to be driven by the drive motor 214 used to drive the capstan 213 and can, for this purpose, be drivingly connected with an endless capstan belt 218, a relay pulley 219 and an idler gear 220 selectively engageable with the take-up drive gear 21. In this design, the length of magnetic recording tape 3 then driven by the capstan 213 so as to travel towards the take-up reel 18 can be taken up around the take-up reel 18 with no substantial load imposed on a portion of the magnetic recording tape 3 on a trailing side of the capstan 213. The take-up drive gear 21 used in the prior art video tape player, however, has a torque limiter built therein, which torque limiter is in the form of a clutch mechanism such as, for example, a magnetic clutch.

As discussed above, in order for information to be recorded or reproduced on or from the length of magnetic recording tape 3, the prior art video tape player requires the use of the tape transport mechanism including the capstan and the rubber-lined pinch roller operable to bring the length of magnetic tape 3 into driving contact with the capstan. Without the tape transport mechanism, no length of magnetic recording tape 3 is transported from the supply reel towards the take-up reel at a predetermined speed synchronized with rotation of the rotary cylinder. In addition, since the pinch roller is used to urge the length of magnetic recording tape 3 into driving contact with the capstan, a substantial amount of load is necessarily imposed from the pinch roller to the capstan. Again, in order for the length of magnetic recording tape 3 to be transported at the predetermined speed synchronized with rotation of the rotary cylinder, the use of an expensive drive motor is necessitated, resulting in increase of the manufacturing cost.

Furthermore, with the torque limiter built in the reel drive gear, friction is at all times produced during the travel of the length of magnetic recording tape at the predetermined speed synchronized with rotation of the rotary cylinder and, for this reason, a loss of energies attributable to the friction is substantial.

SUMMARY OF THE INVENTION

The present invention has been devised to substantially eliminate the problems inherent in the prior art video tape player and is intended to provide an improved video tape player wherein limitations brought about by the necessity of a drive mechanism for driving the pinch roller against the capstan are eliminated.

Another object of the present invention is to provide the video tape player of the type referred to above, in which a tension control mechanism simple in structure and effective to minimize the electric power consumption is employed.

In order to accomplish these and other objects and features of the present invention, there is provided a magnetic recording and/or reproducing apparatus operable with a tape cassette including spaced apart tape supply and take-up reels and a length of magnetic recording tape having its opposite ends anchored to the tape supply and take-up reels, respectively. The apparatus comprises a head carrier carrying at least one magnetic transducer head; first and second hubs adapted to be engaged with the tape supply and take-up reels, respectively, when the tape cassette is loaded in the apparatus; a guide means operable, when the tape cassette is loaded in the apparatus with the tape supply and take-up reels engaged with the first and second hubs, to selectively draw and withdraw a first tape portion of the length of magnetic recording tape extending between the tape supply and take-up reels out of and into the tape cassette to thereby bring that first tape portion to an operative position, at which the length of magnetic recording tape is held in sliding contact with the head carrier, and to a withdrawn position at which the first tape portion is accommodated within the tape cassette, respectively, and a tape transport mechanism.

The tape transport mechanism includes, in a preferred embodiment of the present invention, first and second capstans extending parallel to each other and defining an operative space therebetween; a drive means for driving at least said first capstan about a longitudinal axis of said first capstan; a capstan support member carrying at least the second capstan for movement between a first position, at which said second capstan is separated a first predetermined distance from the first capstan, and a second position at which said second capstan is separated a second predetermined distance from the first capstan which is slightly greater than said first predetermined distance; a roller element normally held at a retracted position when the first tape portion is held in the withdrawn position within the tape cassette, but movable to a biasing position when the first tape portion is drawn to the operative position, said biasing position being defined at a location on one side of the operative space opposite to the retracted position of the roller element and spaced a slight predetermined distance from the operative space, said roller element having an outer diameter slightly greater than said first predetermined distance, but smaller than the second predetermined distance; and a pivotable support member for rotatably carrying the roller element and pivotable to move the roller element between the retracted and biasing positions.

With this construction, as the roller element approaches the biasing position, said second capstan is moved to the second position to allow passage of the roller element across the operative space between the first and second capstans to urge a portion of the magnetic recording tape traversing the operative space to be turned a predetermined angle around each of the first and second capstans. Accordingly, the length of magnetic recording tape can be transported by rotation of the first capstan with no need for the roller element to pressing it against the first capstan.

As described above, according to the present invention, neither the pinch roller, a pressing mechanism for urging the pinch roller against the capstan, nor the crutch mechanism associated with the pressing mechanism, all hitherto required in the prior art video tape player, is needed in the video tape player embodying the present invention.

Preferably, the first and second capstans may have an equal diameter and, in such case, the second capstan should be driven at a speed slightly higher than the first capstan. Alternatively, the second capstan may have a diameter greater than the first capstan and, in such case, the first and second capstans are driven at an equal speed.

If desired, the second capstan may also be drivingly coupled with the drive means by the use of gears.

In order for the operative space to be adjustable so that the roller element approaching the biasing position can pass across the operative space, the pivotable support member may comprise a pivotable arm with the roller element being rotatably mounted at one end on said pivotable arm.

Alternatively, the pivotable support member may comprise a roller holder of a generally U-shaped configuration having first and second arms each having a bearing hole defined therein of a diameter greater than that of any one of the opposite ends of the roller element, with the roller element being supported by the roller holder with the opposite ends thereof loosely accommodated within the respective bearing holes.

Again alternatively, the capstan support member may be a capstan holder of a generally U-shaped configuration having first and second arms. In this case, each of said first and second capstans is journalled to the first and second arms, and the second capstan has radially inwardly depressed annular escapements defined at respective portions of the second capstan axially inwardly of the opposite ends thereof, each of said annular escapements having an axial width corresponding to a thickness of each of the first and second arms. In such case, the use is made of a cam member operable to shift the second capstan axially when said second capstan approaches the second position to allow the respective thicknesses of the first and second arms of the capstan holder to be received within the annular escapement to thereby hold the second capstan at the second capstan.

In another preferred embodiment of the present invention, there is employed a tape tension control mechanism. This tape tension control mechanism comprises a tape transport mechanism disposed between the head carrier and the second hub along a predetermined tape transport path extending from the first hub to the second hub via the head carrier for transporting the length of magnetic recording tape; a reel drive motor for selectively driving the second hub during a winding of the length of magnetic recording tape from the supply reel towards the take-up reel or the first hub during a rewinding of the length of magnetic recording tape from the take-up reel towards the supply reel; a first tension detecting means including a pivotally supported first detecting arm and a first tension adjustment guide post mounted at one end on the first detecting arm so as to extend substantially transverse of said first detecting arm, said first tension adjustment guide post being positioned between the tape transport mechanism and the second hub, said first tension detecting means being operable to maintain a tension of a second portion of the length of magnetic recording tape, extending between the tape transport mechanism and the take-up reel, at a predetermined value regardless of change in diameter of a roll of magnetic recording tape formed around the take-up reel; a second tension detecting means including a pivotally supported second detecting arm and a second tension adjustment guide post mounted at one end on the second detecting arm so as to extend substantially transverse of said second detecting arm, said second tension adjustment guide post being positioned between the first hub and the head carrier, said second tension detecting means being operable to maintain a tension of a third portion of the length of magnetic recording tape, extending between the supply reel and the head carrier, at a predetermined value regardless of change in diameter of a roll of magnetic recording tape formed around the supply reel; a transmission member for transmitting movement of the second detecting arm when the tension of said second portion of the length of magnetic recording tape exceeds the predetermined value; and a control means for controlling the reel drive motor according to the tension of the second portion of the length of magnetic recording tape detected by said first detecting means, but disabling both of said reel drive motor and said tape transport mechanism when the tension of one of the second and third portions of the length of magnetic recording tape exceeds the predetermined value.

Preferably, the tape transport mechanism comprises at least one capstan, a drive motor for driving the capstan about a longitudinal axis of said capstan, and a roller element cooperable with the capstan to transport the length of magnetic recording tape, and wherein said control means comprises a sun gear, at least one planetary gear adapted to revolve around the sun gear in mesh with said sun gear, an internally threaded ring gear coaxial with an axis of rotation of the sun gear and retaining the planetary gear between it and the sun gear, a link member rotatably carrying the planetary gear and rotatable about an axis of rotation in alignment with the sun gear, a braking element for applying a braking force to the ring gear according to the tension of the second portion of the length of magnetic recording tape detected by the first detecting means, and a second transmission member for transmitting rotation of the sun gear to the second hub.

The present invention also pertains to a cassette loading mechanism for loading the tape cassette into the video tape player. This loading mechanism comprises a support plate movable between rest and operative positions; first and second hub adapted to be engaged with the tape supply and take-up reels, respectively, when the tape cassette is mounted on said support plate; a guide means operable, when the tape cassette is mounted on the support plate, to selectively draw and withdraw a first tape portion of the length of magnetic recording tape extending between the tape supply and take-up reels out of and into the tape cassette to thereby bring that first tape portion to an operative position, at which the length of magnetic recording tape is held in sliding contact with the head carrier, and to a withdrawn position at which the first tape portion is accommodated within the tape cassette, respectively; a cassette cover for opening the pivotally supported side lid of the tape cassette in response to mounting of the tape cassette on the support plate and also to cover the tape cassette, said first portion of the length of magnetic recording tape being slidingly engaged with the head carrier by said guide means when the support plate with the tape cassette mounted thereon is moved from the rest position towards the operative position. With this tape loading mechanism, the tape cassette can be advantageously brought to a position as closer to the head carrier than that hitherto achieved in the prior art video tape player utilizing a pop-up loading system.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 13 is a schematic top plan view, on an enlarged scale, showing a tape transport mechanism used in the video tape player shown in FIG. 11;

FIG. 14 is a schematic perspective view showing a support mechanism for support of the first and second capstans forming the respective parts of the tape transport mechanism;

FIG. 16 is a schematic side sectional view, on an enlarged scale, showing the manner in which the biasing roller forming a part of the tape transport mechanism is supported;

DETAILED DESCRIPTION OF THE EMBODIMENTS

First Preferred Embodiment

Figure 1:
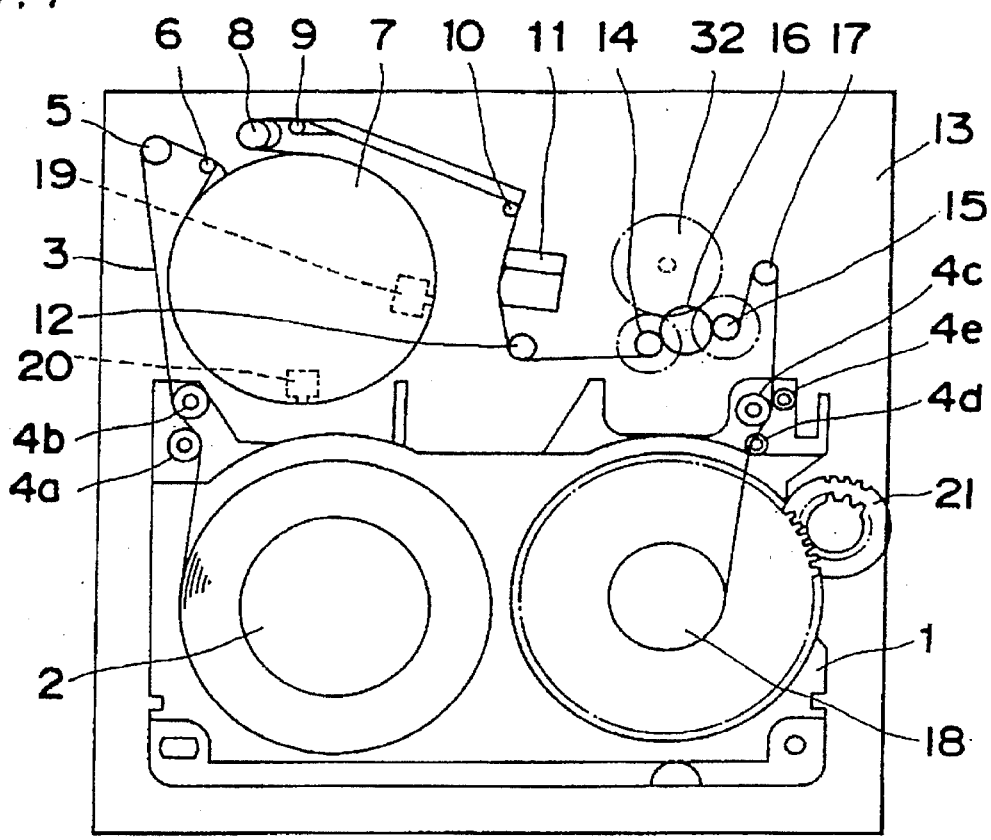
FIG. 1 is a schematic top plan view of a vide tape player according to a first preferred embodiment of the present invention.

A magnetic recording and/or reproducing apparatus (hereinafter referred to as a "video tape player") according to a first preferred embodiment of the present invention is schematically shown in FIG. 1 as viewed from top. In FIG. 1, a standard tape cassette 1 of a generally rectangular configuration having a pivotally supported side lid (shown by 41 in FIG. 5), a supply reel 2, a take-up reel 18 and a length of magnetic recording tape 3 having its opposite ends anchored respectively to the supply and take-up reels 2 and 18 is shown as set in an operative position within a cassette receiving chamber of the video tape player. In this condition, the pivotally supported side lid 41 has been opened and a portion of the magnetic recording tape 3 extending between the supply and take-up reels 2 and 18 and substantially along the pivotally supported side lid 41 has been drawn out of the tape cassette 1 by movable guide posts 5, 8 and 17 and movable inclined guide posts 6, 9 and 10, all of said guide posts being then moved from a rest position to an operative position in a manner well known to those skilled in the art. Specifically, so far shown in FIG. 1, the guide posts 5, 6, 8 and 9 are moved to a position on one side of a head carrier, for example, a rotary cylinder 7, remote from the tape cassette 1 then received within the cassette receiving chamber.

With that portion of the magnetic recording tape 3 drawn out of the tape cassette 1, the length of magnetic recording tape 3 extends from the supply reel 2 towards the rotary cylinder 7 through guide rollers 4a and 4b, positioned at a front left corner of and within the tape cassette 1, by way of the guide posts 5 and 6, and further extends, after having been turned a predetermined angle, for example, 300°, around the rotary cylinder 7, towards the take-up reel 18 through guide rollers 4c, 4d and 4e, positioned at a front right corner of and within the tape cassette 1, by way of guide posts 8, 9, 10, 12 and 17. It is to be noted that the guide post 12 is fixed in position between the movable guide posts 10 and 17 and is mounted on a chassis 13.

So long as the magnetic recording tape 3 extends from the supply reel 2 towards the take-up reel 18 along a predetermined transport path defined by the various guide posts via the rotary cylinder 7, a portion of the magnetic recording tape 3 between the movable inclined guide post 10 and the fixed guide post 12 is held in sliding contact with an audio control head 11. For driving the length of magnetic recording tape 3 from the supply reel 2 towards the take-up reel 18 along the predetermined transport path, a tape transport mechanism including first and second capstans 14 and 15 and a rubber-lined biasing roller 16 is disposed between the fixed guide post 12 and the movable guide post 17. The first and second capstans 14 and 15 are rotatably supported by the chassis 13 in a manner as will be described later, and a portion of the magnetic recording tape 3 straddling a space between the first and second capstans 14 and 15 is urged by the biasing roller 16, then moved from a rest position to a biasing position in unison with the movable guide posts, such that the magnetic recording tape 3 is held in driving contact with and turned a predetermined angle in part around the first capstan 14 and in part around the second capstan 15. As will become clear from the subsequent description, the length of magnetic recording tape 3 extending along the tape transport path via the rotary cylinder 7 can be transported from the supply reel 2 towards the take-up reel 18 by rotation of one or both of the first and second capstans 14 and 15 then being driven in the same direction about their longitudinal axes.

Figure 5A:
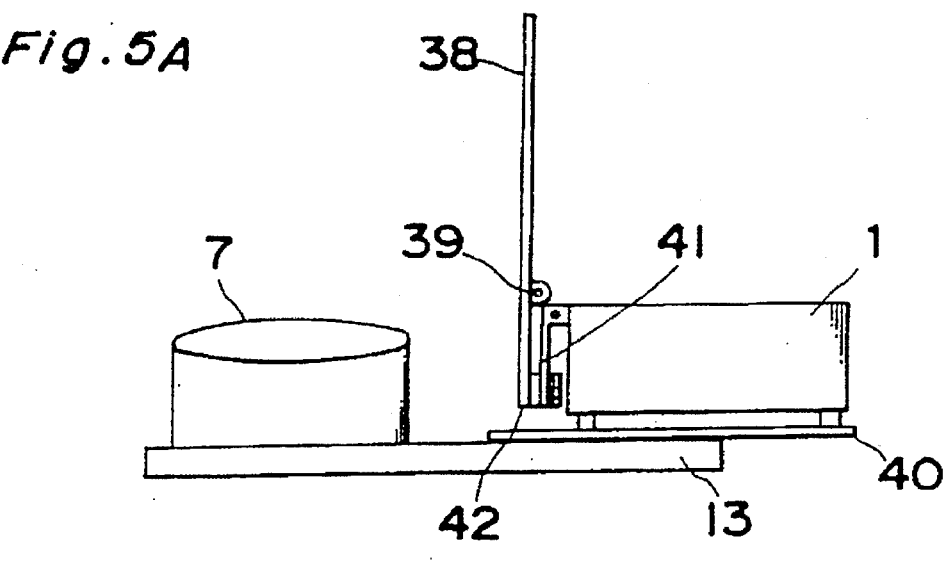
FIGS. 5A to 5C are schematic side views showing a cassette loading mechanism employed in the video tape player in different operative positions, respectively.
Figure 5B:
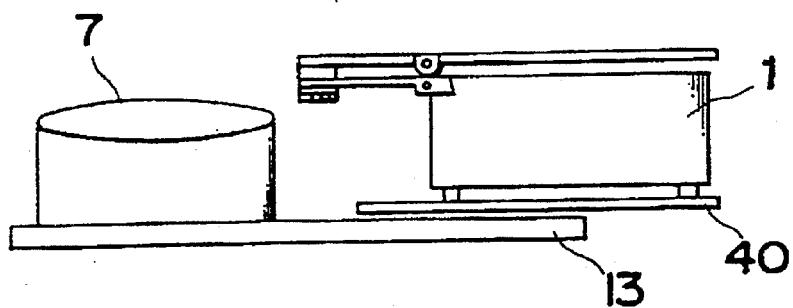
Figure 5C:
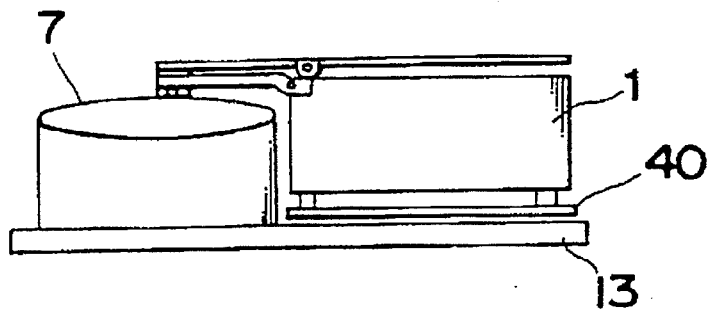

A cassette loading mechanism employed in the video tape player embodying the present invention for loading the tape cassette 1 is shown in FIGS. 5A to 5C. The cassette loading mechanism includes a pivotally supported cover 38 pivotable about a pivot shaft 39 for selectively opening and closing the cassette receiving chamber of the video tape player. A sub-chassis 40 for the support of the tape cassette 1 to be loaded into the video tape player is mounted on a portion of the chassis 13 confronting the cassette receiving chamber and is movable between a retracted position separated a distance away from the rotary cylinder 7 as shown in FIGS. 5A and 5B and an inserted position adjacent the rotary cylinder 7 as shown in FIG. 5C.

With the cassette loading mechanism so constructed as hereinabove described, when the tape cassette 1 is placed above the sub-chassis 40, the pivotally supported side lid 41 of the tape cassette 1 is engaged in a guide groove 42 defined in a side edge of the cover 38. Therefore, as the cover 38 is pivoted clockwise, as viewed in FIGS. 5A to 5C, about the pivot shaft 39 towards a closed position, the side lid 41 of the tape cassette 1 is automatically opened as shown in FIG. 5B. Thereafter, the sub-chassis 40 carrying the tape cassette 1 is driven towards the inserted position adjacent the rotary cylinder 7 as shown in FIG. 5C.

Figure 6:
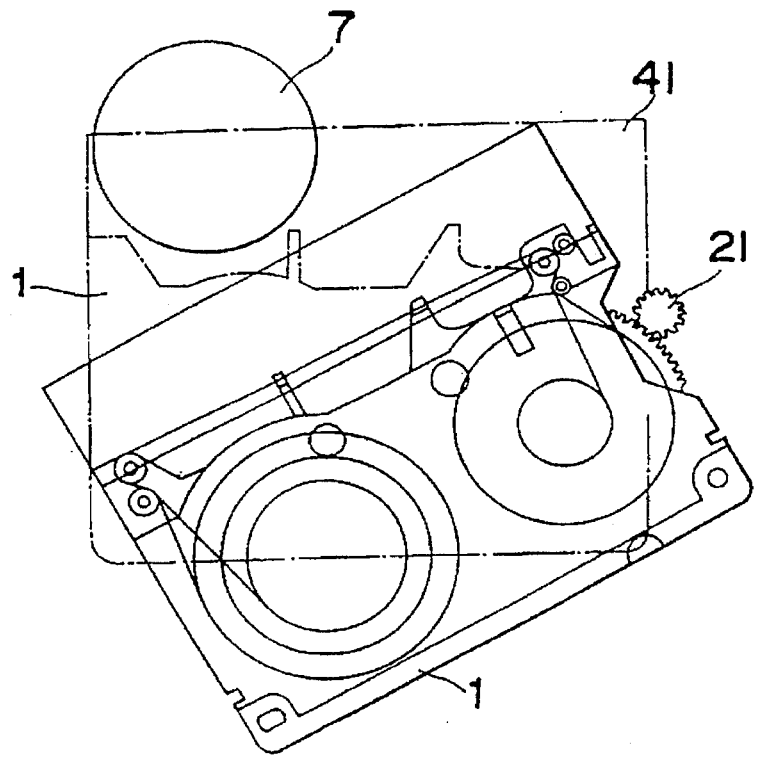
FIG. 6 is a schematic top plan view showing a modified form of the cassette loading mechanism.

While the tape loading mechanism shown in FIGS. 5A to 5C is so designed as to permit the tape cassette 1 to be moved parallel to the chassis 13 together with the sub-chassis 40, it may be so designed as to permit the tape cassette 1 to be pivoted from a retracted position towards an inserted position about a reel drive gear 21 as shown in FIG. 6.

The rotary cylinder 7 in the illustrated embodiment has a double azimuth head assembly 19 and a flying eraser head 20 both mounted thereon for rotation together therewith. The double azimuth head assembly 19 includes a plurality of magnetic heads having different azimuth angles and formed on a single head chip. The rotary cylinder 7 so far employed in the illustrated embodiment is of a type having a drive motor built therein and is adapted to be driven in one predetermined direction by the built-in drive motor.

The take-up reel 18 is adapted to be driven in a required direction by engagement between the reel drive gear 21 and external threads formed on a base of a take-up hub drivingly engaged with the take-up reel 18 as is the case with that in any conventional video tape player. The reel drive gear 21 is driven by a direct current motor 22 through a transmission system shown in FIG. 2 which will now be described.

Figure 2:
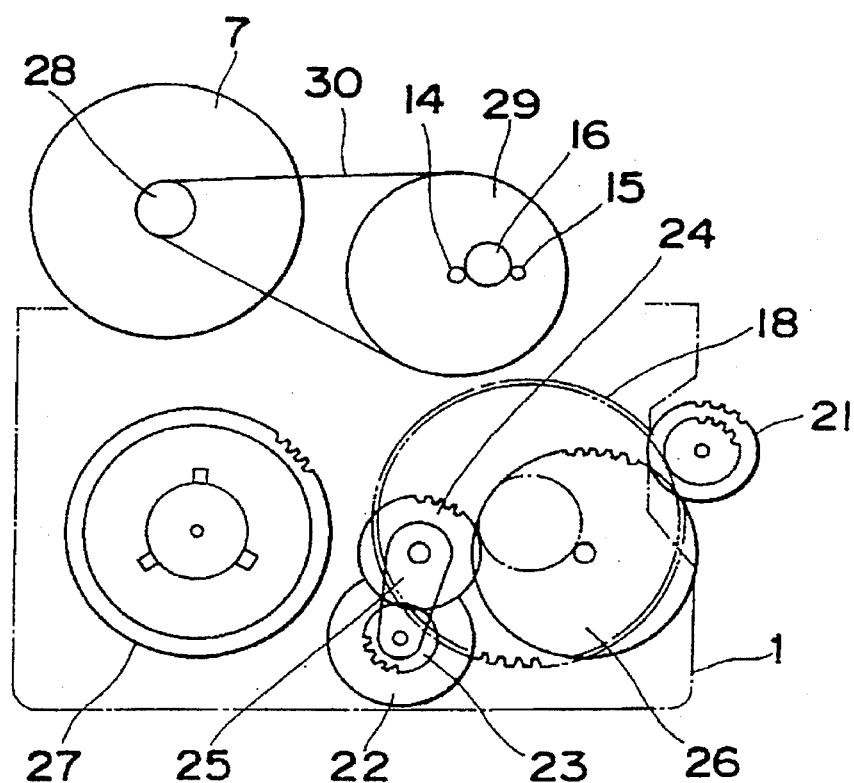
FIG. 2 is a schematic top plan view, with a tape cassette removed, of the video tape player shown in FIG. 1, showing a drive system employed therein.

Referring to FIG. 2, the direct current motor 22 has a drive shaft on which a drive pinion 23 is fixedly mounted for rotation together therewith. An idler arm 25 carrying an idler gear 24 rotatably mounted thereon is mounted rotatably, but axially non-movably on the drive shaft of the direct current motor 22 so as to extend transverse of the drive shaft with the idler gear 24 meshed with the drive pinion 23. The idler gear 24 so mounted on the idler arm 25 is selectively engageable with a relay gear 26 or external threads formed on a base of a supply hub 27 drivingly engaged with the supply reel 2 depending on the direction of rotation of the drive shaft of the direct current motor 22.

The relay gear 26 is held in mesh with a take-up drive gear assembly 21 including coaxially coupled large-diameter and small-diameter gears having different numbers of teeth and, therefore, a drive force transmitted from the idler gear 24 to the relay gear 26 can be transmitted also to the take-up drive gear assembly 21.

The direct current motor 22 used in the illustrated embodiment of the present invention has the following driving characteristic. As is well known to those skilled in the art, as the number of turns of the magnetic recording tape taken up around the take-up reel 18 increases, the diameter of a roll of magnetic recording tape on the take-up reel 18 increases. During the winding of the magnetic recording tape 3 around the take-up reel 18, the tension of that portion of the magnetic recording tape 3 extending between the second capstan 15 and the take-up reel 18 varies with increase of the diameter of the roll of the magnetic recording tape on the take-up reel 18. In other words, if the rotational torque of the take-up reel 18 is fixed regardless of change in diameter of the roll of the magnetic recording tape on the take-up reel 18, the tension acting on the length of magnetic recording tape 3 then travelling from the supply reel 2 towards the take-up reel 18 increases undesirably. This problem is effectively eliminated in the illustrated embodiment of the present invention.

Referring now to FIG. 2, for the purpose of discussion, the ratio of reduction in speed from the direct current motor 22 to the take-up reel 18 is expressed by m. Also, if the speed (rpm) of the take-up reel 18 at an initial stage of tape winding at which a leading end portion of the length of magnetic recording tape 3 has been wound around the take-up reel 18, the torque required by the take-up reel 18 at a final stage of tape winding at which a trailing end portion of the length of magnetic recording tape 3 is wound around the tape-up reel 18, and the speed (rpm) of the take-up reel 18 at the final stage of tape winding, all required to establish a condition in which the final tension acting on the magnetic recording tape 3 at the final stage of tape winding is equalized to the initial tension that has acted on the magnetic recording tape 3 at the initial stage of tape winding, are expressed by $V_B$, $\phi_E$ and $V_E$, respectively, the initial torque $T_B$ of the direct current motor 22 at the initial stage of tape winding and the final torque $T_E$ of the same direct current motor 22 at the final stage of tape winding have the following relationships:

$$T_B = \phi_B / m \qquad (1)$$

$$T_E = \phi_E / m \qquad (2)$$

Also, the speed $v_B$ of the direct current motor 22 at the initial stage of tape winding and the speed $v_E$ of the same direct current motor 22 at the final stage of tape winding are expressed as follows:

$$v_B = m \cdot V_B \qquad (3)$$

$$v_E = m \cdot V_E \qquad (4)$$

Figure 10:
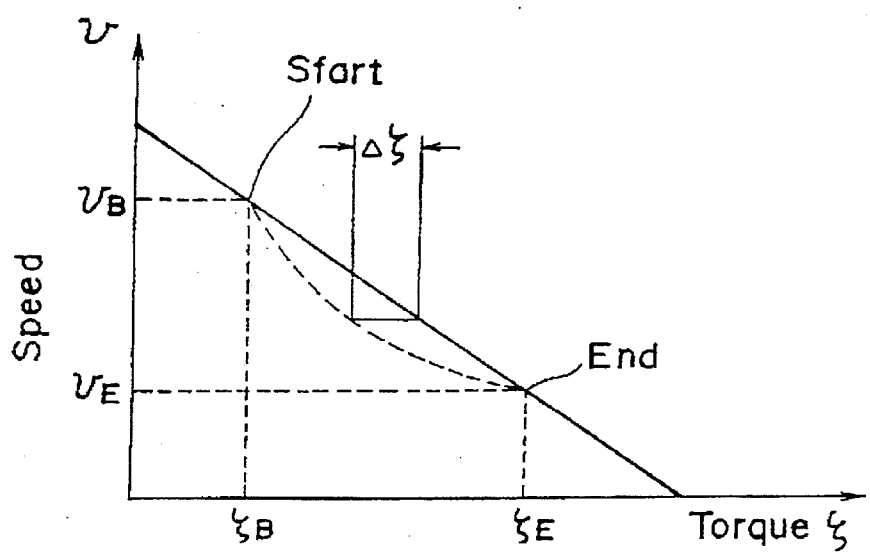
FIG. 10 is a graph showing a relationship between a motor speed and a driving torque both exhibited by a direct current motor used to drive the first capstan.

FIG. 10 illustrates a relationship between the torque T and the speed v of the direct current motor 22, which can be expressed by the following equation.

$$v = n \cdot T + L \qquad (5)$$

wherein L represents the starting torque of the direct current motor 22 and n represents a gradient of a characteristic curve descriptive of a change in speed of the direct current motor 22 relative to the starting torque T.

Inserting the torques and speeds of the direct current motor 22 at the initial and final stages of tape winding to the equation (1) results in:

$$v_B = n \cdot T_B + L \tag{6}$$

$$v_E = n \cdot T_E + L \tag{7}$$

Inserting the equations (1) and (3) in the equation (6) results in:

$$V_B \cdot m = (n \cdot \phi_B / m) + L \tag{8}$$

and inserting the equations (2) and (4) in the equation (7) results in:

$$V_E \cdot m = (n \cdot \phi_E / m) + L \tag{9}$$

Subtracting the equation (9) from the equation (8) gives:

$$(V_B - V_E) m = n \cdot (\phi_B - \phi_E)/m, \text{ that is } m = \pm \{n(\phi_B - \phi_E)/(V_B - V_E)\}^{1/2} \tag{10}$$

Assuming that the maximum diameter of the roll of the magnetic recording tape 3 on the take-up reel 18 is 37.6 mm, the minimum diameter of the roll of the magnetic recording tape 3 on the take-up reel 18 is 14 mm, and the tension of the magnetic recording tape at each of the initial and final stage of tape winding is 30 gr, the parameters $\phi_B$ and $\phi_E$ result in:

$\phi_B = 21$ gcm, and $\phi_E = 56.4$ gcm.

Assuming that the length of magnetic recording tape 3 is moved at a speed of 33.35 mm/sec during a recording mode of the video tape player, the parameters $V_B$ and $V_E$ result in:

$V_B = 45.5$ rpm, and $V_E = 17$ rpm.

The gradient n of a characteristic curve descriptive of a change in speed of the direct current motor 22 used is equal to the quotient, given a minus sign, of the speed of the direct current motor 22 under a non-loaded condition divided by the starting torque, that is, {n=–(the speed of the motor 22 under a non-loaded condition)/(the starting torque of the motor 22)}. Therefore, assuming that the starting torque is 135 gcm and the speed of the direct current motor 22 under the non-loaded condition is 4,907 rpm, the minus-signed quotient results in about −36.348 and, therefore, from the equation (10), the reduction ratio m results in 6.72.

It is to be noted that in the foregoing discussion concerning the driving characteristic of the direct current motor 22, no transmission loss occurring in a transmission system including the various gears has been taken into consideration for the sake of clarity. However, where the transmission loss is detrimental, the necessary torque of the direct current motor 22 should be calculated by adding thereto a value corresponding to the transmission loss. A curve shown by the broken line in FIG. 10 represents a relationship between the speed of the direct current motor 22 and the torque produced thereby when the tension of the magnetic recording tape 3 is constantly held at a predetermined value from the start of tape winding to the end of tape winding around the take-up reel 18. Where the direct current motor 22 is driven with a predetermined voltage applied thereto, an excessive quantity, shown by $\Delta \zeta$, of the torque acts during the magnetic recording tape 3 being taken up around the take-up reel 18 and, therefore, the tension of the magnetic recording tape 3 increases to a certain extent. Where the torque quantity $\Delta \zeta$ must be minimized, the direct current motor 22 should be controlled by detecting the speed of rotation of the take-up reel 18 and then changing the voltage to be applied to the direct current motor 22 according to the detected speed of rotation of the take-up reel 18.

The first capstan 14 cooperable in a manner as will be described later with the biasing roller 16 and also with the second capstan 15 to transport the length of magnetic recording tape 3 at a predetermined speed has a flywheel 29 coaxially mounted thereon for rotation together therewith. This first capstan 14 is drivingly coupled with the drive motor, built in the rotary cylinder 7, through an endless drive belt 30 by way of a cylinder pulley 28 that is coaxially secured to a lower end of the rotary cylinder 7. Accordingly, the first capstan 14 is driven in a predetermined direction, for example, counterclockwise as viewed in FIG. 1, about the longitudinal axis thereof by the built-in motor of the rotary cylinder 7.

When the first capstan 14 is driven by the motor built in the rotary cylinder 7 by means of the endless drive belt 30, a rotational force exerted by the first capstan 14 is transmitted to the second capstan 15, in a manner which will be described with reference to FIGS. 3 and 4, when the second capstan 15 is moved to a predetermined position.

A drive transmission mechanism for transmitting the rotational force of the first capstan 14 to the second capstan 15 will now be described. Referring first to FIG. 4, the second capstan 15 has first and second capstan pinions 31a and 31b mounted thereon under an interference fit and spaced axially from each other a distance greater than the width of the length of magnetic recording tape 3. Similarly, the first capstan 14 has first and second capstan pinions 32a and 32b (FIG. 3) mounted thereon under an interference fit and spaced axially from each other a similar distance greater than the width of the length of magnetic recording tape 3, said first and second capstan pinions 32a and 32b being of an identical structure with the first and second capstan pinons 31a and 31b on the second capstan 15.

The rotational force of the first capstan 14 is transmitted to the second capstan 15 through a capstan relay gear 33 rotatably mounted on a chassis with its axis of rotation positioned so as to occupy one of apexes of the shape of a triangle, the remaining apexes thereof being occupied respectively by the first and second capstans 14 and 15. As best shown in FIG. 4, the capstan relay gear 33 is of a generally cylindrical configuration having its opposite ends radially outwardly flanged and circumferentially toothed to define respective gears that are meshed with the first and second capstan pinions 31a, 32a and 31b, 32b of the respective first and second capstans 14 and 15. It is, however, to be noted that actual engagement between the capstan relay gear 33 and the first and second capstan pinions 31a and 31b on the second capstan 15 takes place when the second capstan 15 is moved to a predetermined, engaged position which will now be described.

Figure 3:
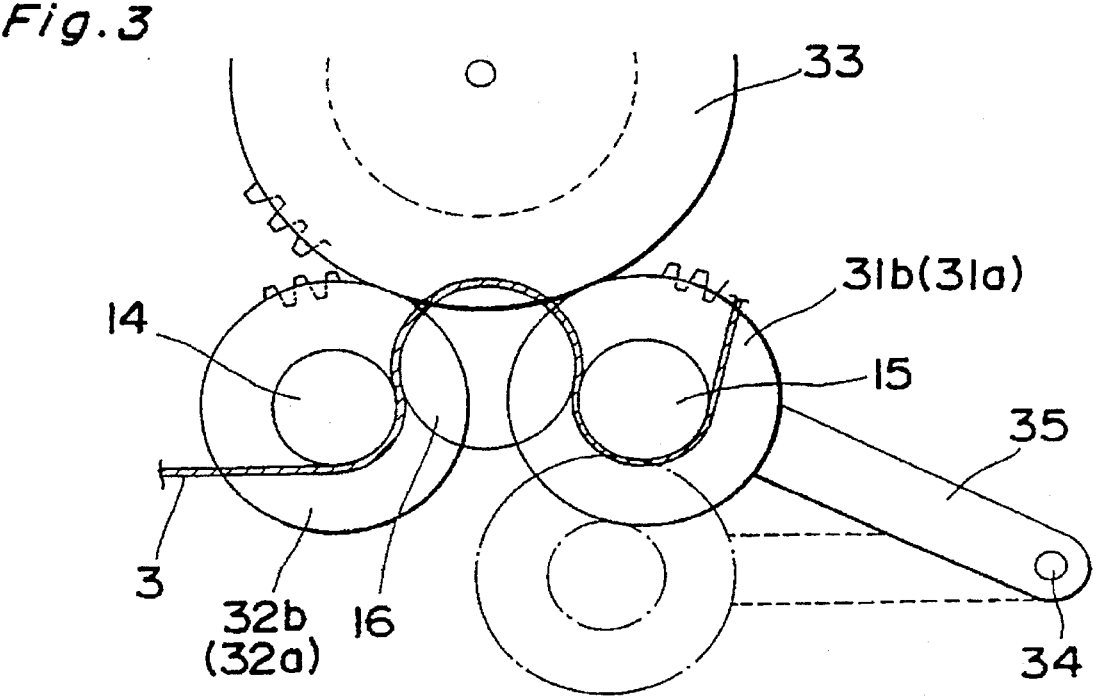
FIG. 3 is a schematic top plan view, on an enlarged scale, showing a tape transport mechanism used in the video tape player shown in FIG. 1.

The second capstan 15 is rotatably supported by a capstan holder 35 rotatably mounted on the chassis 13 by means of a pivot pin 34 and is pivotable between a disengaged position, shown by the phantom line in FIG. 3, and the engaged position shown by the solid line. The pivot pin 34 about which the capstan holder 35 pivots is disposed on one side of the second capstan 15 then held at the engaged position remote from the capstan relay gear 33. Clockwise pivot of the capstan holder 35 about the pivot pin 34, that is, angular movement of the second capstan 15 to the engaged position, takes place when that portion of the magnetic recording tape 3 straddling a space between the first and second capstans 14 and 15 is urged and, therefore, deformed by the biasing roller 16 so as to represent the shape generally similar to the shape of a figure "Ω" as a result of movement of the biasing roller 16 from the rest position to the biasing position.

More specifically, when the biasing roller 16 is moved to the biasing position as shown in FIG. 3, the axis of rotation of the biasing roller 16 occupies a position on one side of the imaginary line connecting between the respective axes of rotation of the first and second capstans 14 and 15 adjacent the capstan relay gear 33. At this time, the second capstan 15 is held at the engaged position pulled by that portion of the magnetic recording tape 3 around the biasing roller 16 and, therefore, the first and second capstan pinions 31a and 31b coaxial with the second capstan 15 are engaged with the capstan relay gear 33. Thus, as the biasing roller 16 is moved to the biasing position, the second capstan 15 is also moved to the engaged position with the capstan holder 35 pivoting clockwise about the pivot pin 34.

Figure 4:
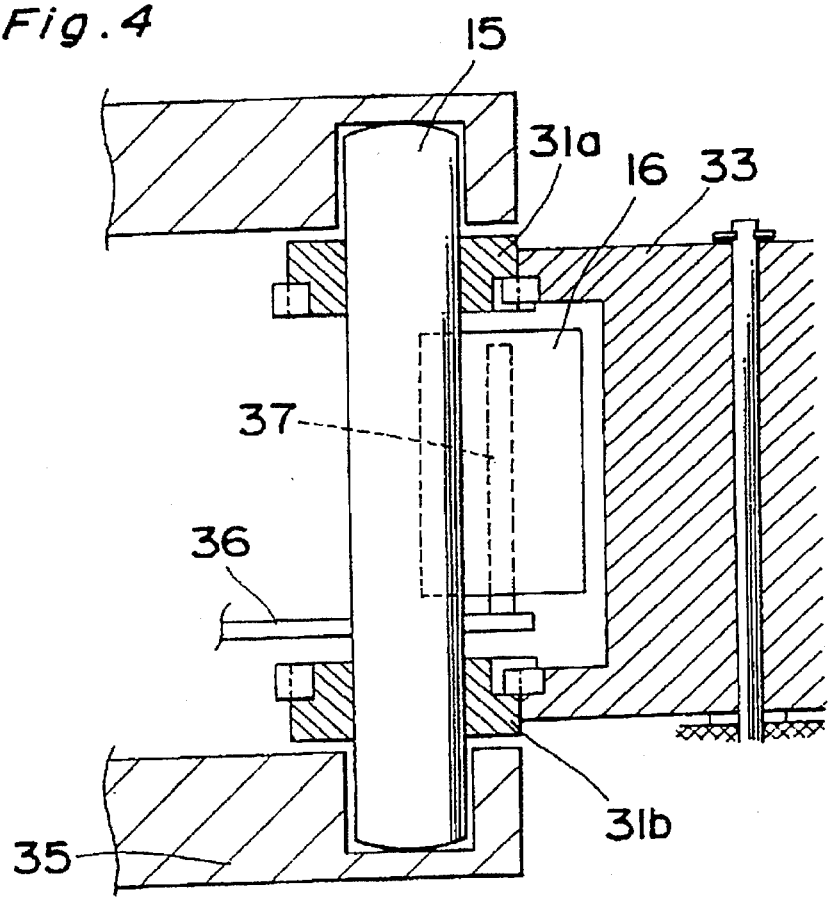
FIG. 4 is a schematic side sectional view, on an enlarged scale, showing the manner in which a second capstan forming a part of the tape transport mechanism is supported.

The biasing roller 16 is angularly movable between the rest position and the biasing position and, for this purpose, as shown in FIG. 4, the biasing roller 16 is rotatably mounted on a roller spindle 37 that is fixedly mounted on a movable holder arm 36. It is to be noted that the biasing roller 16 is so loosely mounted on the roller spindle 37 that, when the biasing roller 16 is in the biasing position, it will not contact the roller spindle 37 or, even though it will contact the roller spindle 37, the biasing roller 16 will be immune from any external force which would be transmitted from the roller spindle 37. The first and second capstans 14 and 15 are spaced a minimum distance that is so chosen as to allow the biasing roller 16 being moved towards the biasing position to pass the space therebetween regardless of the position of the second capstan 15.

In the illustrated embodiment, the length of magnetic recording tape 3 is transported from the supply reel 2 towards the take-up reel 18 around the rotary cylinder 7 by means of the driving force transmitted from the capstan relay gear 33 to both of the first and second capstans 14 and 15 while respective portions of the length of magnetic recording tape 3 are urged to and turned around the first and second capstans 14 and 15 by the biasing roller 16 then moved to the biasing position as best shown in FIG. 3. A tape transport system accomplished by the first and second capstans 14 and 15 will be discussed in detail with particular reference to FIG. 7.

Let it be assumed that the tension acting on a leading portion of the length of magnetic recording tape 3 between the second capstan 15 and the take-up reel 18 then taking up the length of magnetic recording tape 3 and the tension acting on a trailing portion of the length of magnetic recording tape between the rotary cylinder 7 and the first capstan 14 are expressed by $t_5$ and $t_1$, respectively, and that the angle of turn of the magnetic recording tape 3 around any one of the first and second capstans 14 and 14 with respect to the axis of rotation of the respective capstan is expressed by θ. Also, the angle formed between the first imaginary line parallel to the second imaginary line drawn to connect the respective axes of rotation of the first and second capstans 14 and 15 (the second capstan 15 being then held at the engaged position) together and passing through the axis of rotation of the biasing roller 16, then held in the biasing position, and the imaginary line drawn to connect together the axis of rotation of each of the first and second capstans 14 and 15 and the axis of rotation of the biasing roller 16 in the biasing position is expressed by α. In other words, the imaginary line drawn to connect the axis of rotation of the biasing roller 16 in the biasing position and the axis of rotation of the first capstan 14 together and the imaginary line drawn to connect the axis of rotation of the biasing roller 16 in the biasing position and the axis of rotation of the second capstan 15 together form an angle of (180°−2α).

Figure 8:
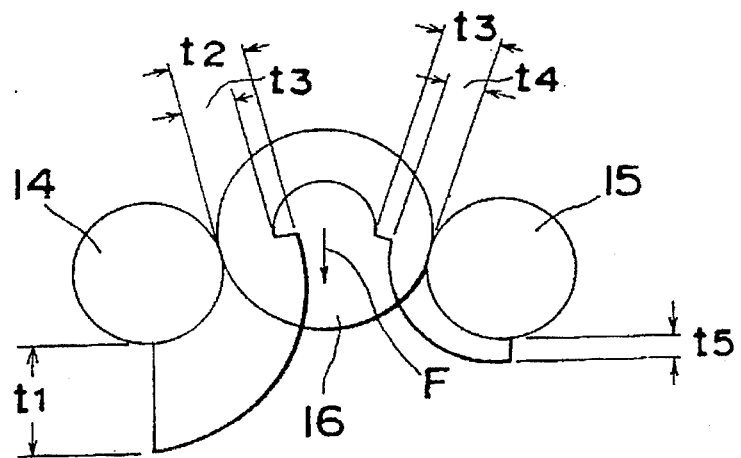
FIG. 8 is a diagram similar to FIG. 7, illustrating tensions acting on various portions of each of the first and second capstans and the biasing roller.

FIG. 8 illustrates a distribution of tensions acting on that portion of the length of magnetic recording tape 3 between the first and second capstans 14 and 15. A force F acting to return the biasing roller 16 back to the rest position, which is produced by the tension $t_3$ of the magnetic recording tape 3 acting on the biasing roller 16 then in the biasing position is expressed by the following equation.

$$F = 2t_3 \cdot \cos \alpha \qquad (11)$$

The pressure P produced at the point of contact between the biasing roller 16 and each of the first and second capstans 14 and 15 is expressed by the following equation.

$$P = (F/2) \cdot (1/\sin \alpha) \qquad (12)$$

Inserting the equation (11) above into the equation (12) results in:

$$P = \{1/(2 \cdot \sin \alpha)\} \cdot 2t_3 \cdot \cos \alpha = t_3/\tan \alpha \qquad (13)$$

Hence, the tension $t_3$ is:

$$t_3 = (t_1/e^{\mu\theta}) - P\mu \qquad (14), \text{ or}$$

$$t_3 = t_5 \cdot e^{\mu\theta} + P\mu \qquad (15)$$

wherein μ represents a coefficient of friction between the length of magnetic recording tape 3 and each of the first and second capstans 14 and 15. Summing the equations (14) and (15) together results in:

$$2t_3 = t_1/e^{\mu\theta} + t_5 \cdot e^{\mu\theta} \qquad (16)$$

Inserting the equation (13) into the equation (14) results in:

$$t_3 = t_1(1/e^{\mu\theta}) - \mu(t_3/\tan \alpha) \qquad (17)$$

Solving the equation (17) to give the tension $t_3$ results in:

$$t_3 = (t_1/e^{\mu\theta}) \cdot \{1/(1+\mu/\tan \alpha)\} \qquad (18)$$

Also, from the equation (16), $$t_1 = e^{\mu\theta}(2t_3 - t_5 \cdot e^{\mu\theta}) \qquad (19)$$

Inserting the equation (19) into the equation (18) results in:

$$t_1 = e^{\mu\theta}\{2t_1/e^{\mu\theta}(1+\mu/\tan \alpha) - t_5 \cdot e^{\mu\theta}\} \qquad (20)$$

Therefore, solving the equation (20) to give the tension $t_1$ results in:

$$t_1 = \{t_5(1+\mu/\tan \alpha)/(1-\mu/\tan \alpha)\} \cdot e^{2\mu\theta} \qquad (21)$$

Figure 9:
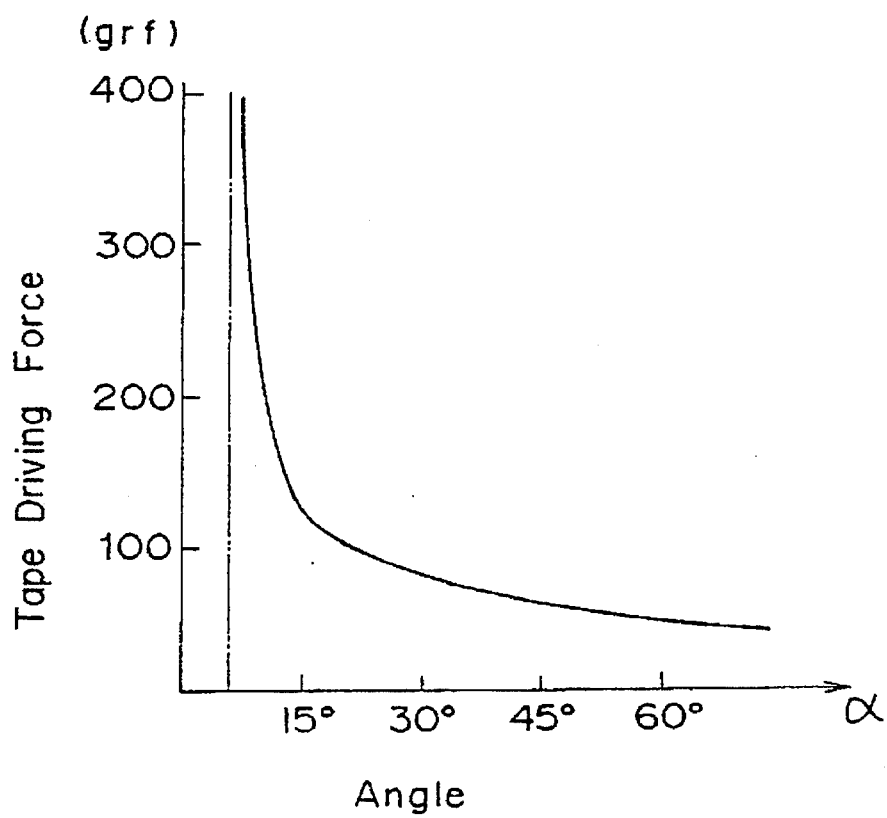
FIG. 9 is a graph showing a drive characteristic of the tape transport mechanism.

FIG. 9 illustrates a graph showing a change in tape driving force obtained when the angle α is changed while the parameters μ, θ and $t_5$ in the equation (21) are fixed respectively to 0.1, 180° and 30 gr. In this graph of FIG. 9, the angle α and the tape driving forces are expressed on the axis of abscissas and the axis of ordinates, respectively. Under these circumstances, determination of the angle α that renders the term of (1−μ/tan α) in the equation (20) to be zero (0) results in 5.71° and, as shown in the graph of FIG. 9, the tape driving force becomes infinitely large.

As hereinabove discussed, in the practice of the first preferred embodiment of the present invention, to drive the length of magnetic recording tape 3 along the predetermined tape transport path in one direction from the supply reel 2 towards the take-up reel 18, the driving force exerted by each of the first and second capstans 14 and 15 is utilized without the biasing roller 16 pressing those respective portions of the magnetic recording tape 3 against the first and second capstans 14 and 15. In other words, those respective portions of the magnetic recording tape 3 are held in face-to-face contact with the first and second capstans 14 and 15 while having been turned the predetermined angle about the axis of rotation of the respective capstan and, therefore, the driving force from each of the first and second capstans 14 and 15 can be effectively transmitted to the length of magnetic recording tape 3 with no need to press the length of magnetic recording tape 3 against any one of the first and second capstans 14 and 15 by the application of an external force.

Second Preferred Embodiment

Figure 11:
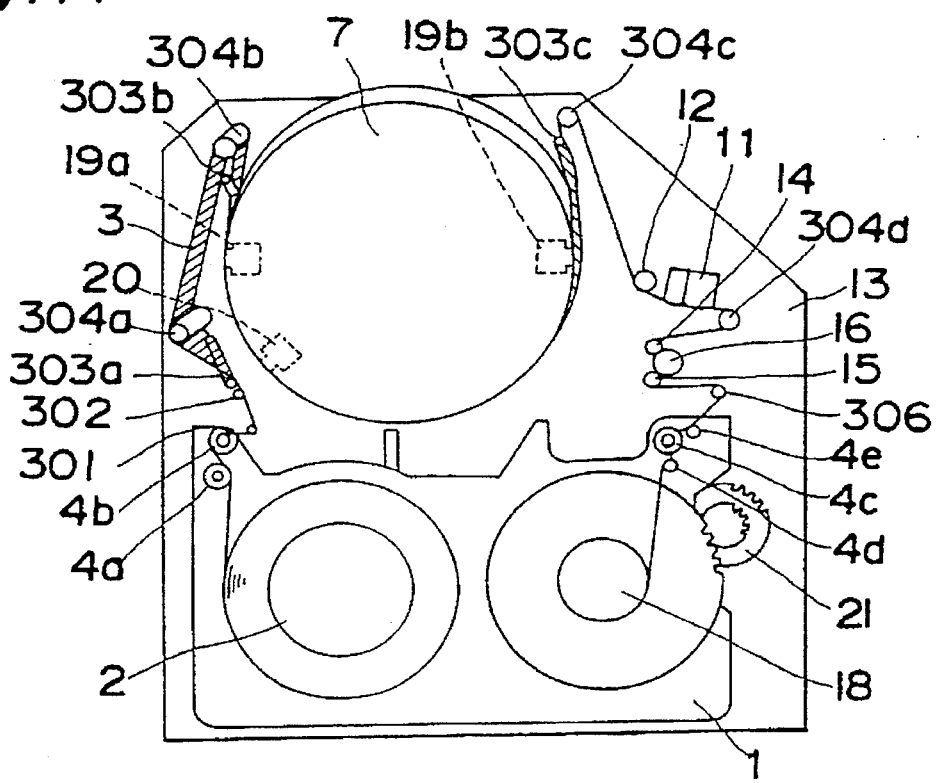
FIG. 11 is a schematic top plan view showing the video tape player according to a second preferred embodiment of the present invention.

The video tape player according to a second preferred embodiment of the present invention is schematically shown in FIG. 11 as viewed from top. The various guide posts that define the tape transport path and the tape transport mechanism including the first and second capstans 14 and 15 and the biasing roller 16, both employable in the video tape player according to the second preferred embodiment of the present invention may be identical with those employed in the video tape player according to the foregoing embodiment of the present invention. However, a different guide post arrangement is employed in the video tape player shown in FIG. 11, which will now be described.

Referring now to FIG. 11, the guide posts are identified by 302, 303a to 303c and 304a to 304d. Of them, the guide post 303a is a movable inclined guide post, the guide posts 303b and 303c are a fixed inclined guide post secured to the chassis 13 and the guide posts 304a to 304c are movable guide posts lying perpendicular to the chassis 13.

The guide post 305 corresponds in function to the fixed guide post 12 used in the video tape player according to the first embodiment of the present invention. The guide post 306 corresponds in function to the movable guide post 17 employed in the first embodiment of the present invention, but has a dual function, i.e., functioning as an equivalent of the movable guide post 17 and also as a leading tension adjustment guide post in cooperation with a trailing tension adjustment guide post 301 that is disposed on the trailing side with respect to the direction of travel of the length of magnetic recording tape 3 towards the take-up reel 18. As will become clear from the subsequent description, the tension adjustment guide posts 301 and 306 form respective parts of a tension control mechanism.

The specific arrangement of the various guide posts operable to draw that portion of the length of magnetic recording tape 3 out from the tape cassette 1 so as to turn it around the rotary cylinder 7 does not constitute subject matter of the present invention and, therefore, any know guide post arrangement may be employed. While the details of the guide post arrangement will not be hereinafter discussed for the sake of brevity, that portion of the length of magnetic recording tape 3 is shown in FIG. 11 as turned about 190° around the rotary cylinder 7, but the present invention should not be limited to the use of the specific angle of turn of the magnetic recording tape 3 around the rotary cylinder 7.

Also, so far as shown in FIG. 11, the rotary cylinder 7 carries, instead of the double azimuth head 19 employed in the first embodiment of the present invention, magnetic recording and/or reproducing heads of different azimuth angles, as indicated by 19a and 19b, which are spaced circumferentially of the rotary cylinder 7. However, the specific type and/or arrangement of magnetic heads carried by the rotary cylinder 7 do not constitute subject matter of the present invention, bearing it in mind that the double azimuth head 19 shown in FIG. 1 may be equally employed in the video tape player shown in FIG. 11.

In the second preferred embodiment of the present invention, one of the first and second capstans 14 and 15 of the tape transport mechanism which is positioned on the leading side with respect to the direction of travel of the length of magnetic recording tape 3 towards the take-up reel 18, that is, the second capstan 15, is chosen to be driven at a peripheral speed slightly higher than that of the first capstan 14. For this purpose, if the first and second capstans 14 and 15 are driven at an equal speed about the respective axes of rotation thereof, the second capstan 15 should have a diameter slightly greater than that of the first capstan 14. Alternatively, if the second capstan 15 has a diameter equal to or slightly smaller than that of the first capstan 14, the second capstan 15 should be driven at a higher speed about the axis of rotation thereof than that of the first capstan 14.

As mentioned above, in the second preferred embodiment of the present invention, the speed at which the length of magnetic recording tape 3 is driven by the second capstan 15 is chosen to be slightly higher than that at which the length of magnetic recording tape 3 is driven by the first capstan 14.

The leading tension adjustment guide post 306 is utilized to detect the tension of the length of magnetic recording tape 3 being wound around the take-up reel 18 so that the torque of the take-up reel 18 within the tape cassette 1 can be controlled. For this purpose the tension control mechanism including the leading tension adjustment guide post 306 is used to control the drive of the take-up drive gear assembly 21 that drives the take-up reel 18 through the associated hub. The details of this tension control mechanism are shown in FIG. 12.

Figure 12:
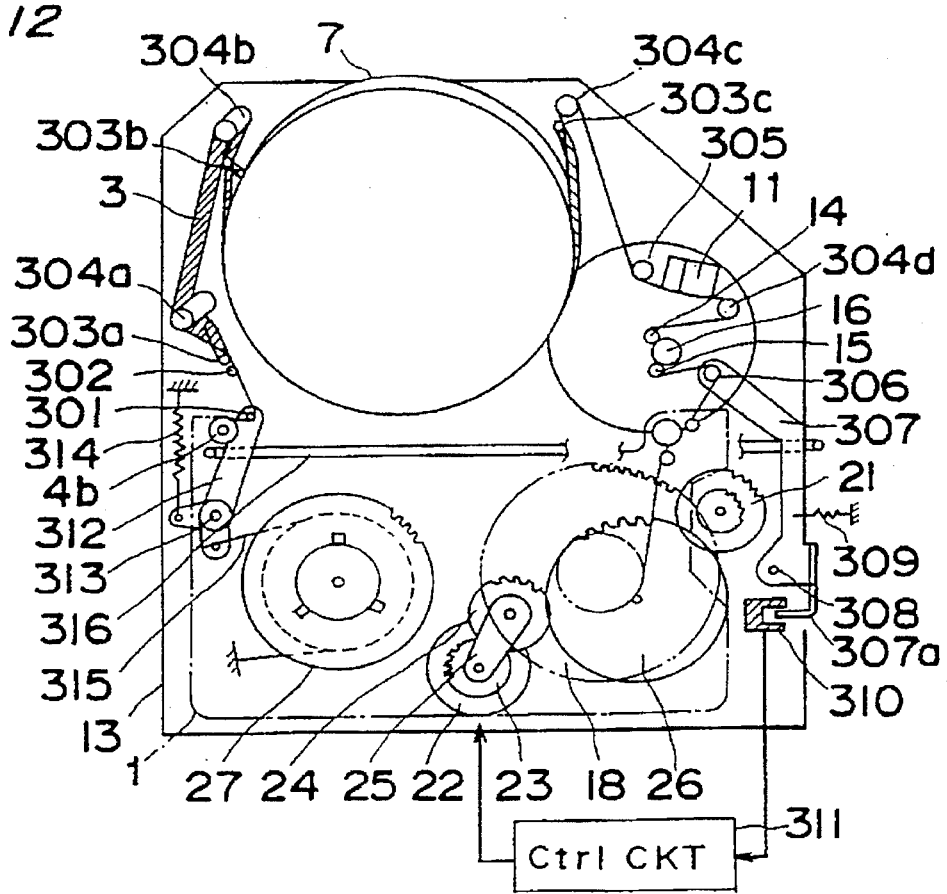
FIG. 12 is a schematic top plan view, with a tape cassette removed, of the video tape player shown in FIG. 11, showing a drive system employed therein.

Referring to FIG. 12, the leading tension adjustment guide post 306 is rotatably mounted on a free end of a leading tension detecting arm 307 having the opposite end pivotally connected to the chassis 13 through a pivot pin 308. This leading tension detecting arm 307 is normally biased clockwise, as viewed in FIG. 12, about the pivot pin 308 by a biasing element such as, for example, a tension spring 309. The opposite end of the leading tension detecting arm 307 remote from the leading tension adjustment guide post 306 has a light intercepting member 307a secured thereto for movement together therewith, the function of said light intercepting member 307a being described later.

A photoelectric detector 310 is mounted on the chassis 13 at a location adjacent the light intercepting member 307a carried by the leading tension detecting arm 307. The photoelectric detector 310 may be of any known construction including a light emitter and a light sensor and having a light path defined between the light emitter and a light sensor, which light path is adapted to be intercepted by the light intercepting member 307a in a varying degree according to the magnitude of the tension exerted by the portion of the length of magnetic recording tape 3 between the tape drive mechanism and the take-up reel 18. In other words, the quantity of light emitted by the light emitter and subsequently received by the light sensor varies depending on the position of the light intercepting member 307a in the light path between the light emitter and the light sensor. Accordingly, it will readily be understood that an output signal from the photoelectric detector 310 is indicative of and proportional to the magnitude of the tension exerted by that portion of the length of magnetic recording tape 3.

The output signal from the photoelectric detector 310 is supplied to a control circuit 311 which produces a voltage to be applied to the direct current motor 22 that is necessary to maintain the tension of that portion of the length of magnetic recording tape 3 substantially constantly at a predetermined value, which voltage varies according to the detected tension of that portion of the length of magnetic recording tape 3.

On the other hand, the trailing tension adjustment guide post 301 is disposed on one side of the tape cassette 1 remote from the leading tension detecting arm 307 is rotatably mounted on the a trailing tension detecting arm 312 for angular movement together therewith about a pivot pin 313. This trailing tension adjustment guide post 301 is normally biased clockwise, as viewed in FIG. 12, about the pivot pin 313 by a biasing element such as, for example, a tension spring 314. One of the opposite ends of the trailing tension detecting arm 312 remote from the trailing tension adjustment guide post 301 is connected with a tensioning band 315 operable to apply a frictional force to the outer peripheral surface of the supply hub 27 drivingly engaged with the supply reel 2 so that a portion of the length of magnetic recording tape 3 extending outwardly from the supply reel 2 can be held under a predetermined tension regardless of a change in outer diameter of a roll of magnetic recording tape around the supply reel 2.

Reference numeral 316 shown in FIG. 12 represents a connecting rod for transmitting angular movement of the trailing tension detecting arm 312 to the leading tension detecting arm 307 when, consequent upon the length of magnetic recording tape 3 having been substantially completely take up around the take-up reel 18 with the supply reel 2 emptied, the trailing tension detecting arm 312 is pivoted counterclockwise about the pivot pin 313 against the tension spring 314. This connecting rod 316 is so positioned, and has a length so chosen, that unless the length of magnetic recording tape 3 is substantially completely taken up around the take-up reel 18, and during any of the recording and reproducing modes of the video tape player, opposite ends of the connecting rod 316 will not contact the detecting arms 312 and 307, respectively.

The relationship in position between the first and second capstans 14 and 15 and the biasing roller 16, both employed in the second preferred embodiment of the present invention is shown in FIG. 13. While in the foregoing embodiment of the present invention, the second capstan 15 has been shown and described as mounted on the pivotable capstan holder 35 angularly movable between the disengaged and engaged positions about the pivot pin 34, the second capstan 15 employed in the practice of the second embodiment of the present invention is fixed in position as shown in FIGS. 13 and 14. Also, while in the foregoing embodiment of the present invention the first capstan 14 has been shown and described as driven by the motor built in the rotary cylinder 7 by means of the endless drive belt 30, the first capstan 14 employed in the practice of the second embodiment of the present invention is adapted to be driven by a direct drive system, that is, coupled direct with a capstan drive motor 317. It is to be noted that this direct drive system may be equally employed in the practice of the foregoing embodiment of the present invention.

Referring to FIGS. 13 and 14, the first and second capstans 14 and 15 are rotatably supported by and mounted on the chassis 13 through a capstan holder 318 of a generally U-shaped configuration. Respective upper ends of the first and second capstans 14 and 15 protruding rotatably outwardly from an upper arm of the capstan holder 318 has first and second pinions 319 and 320 rigidly mounted thereon for rotation together therewith, respectively. The first and second pinions 319 and 320 rigid with the first and second capstans 14 and 15 are in turn meshed with a relay gear 321 rotatably mounted on the upper arm of the capstan holder 318 so that the first and second capstans 14 and 15 can be rotated in the same direction about their longitudinal axes. A lower end of the first capstan 14 rotatably protruding outwardly from a lower arm of the capstan holder 318 is coupled direct with the capstan drive motor 317.

Figure 15:
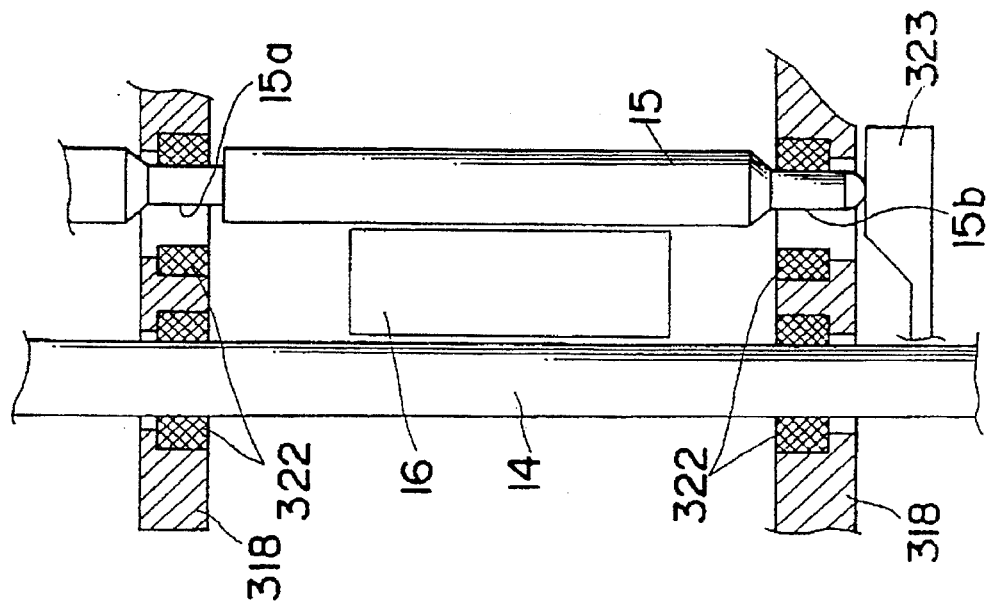
FIG. 15 is a schematic side sectional view, on an enlarged scale, showing the tape transport mechanism used in the video tape player according to the second embodiment of the present invention, said tape transport mechanism being held in one operative position.

As best shown in FIG. 15, the first and second capstans 14 and 15 are rotatably supported by the upper and lower arms of the capstan holder 318 through respective pairs of bearings, generally identified by 322. The second capstan 15 shown therein has respective portions adjacent the opposite ends thereof which are radially inwardly narrowed to define respective circumferentially extending annular escapements 15a which function in a manner as will be described later. The lower end of the second capstan 15 protruding outwardly from the lower arm of the capstan holder 318 rests on a cam plate 323 positioned between the lower arm of the capstan holder 318 and the capstan drive motor 317 for selective movement in a direction perpendicular to the longitudinal axis of the capstan. This cam plate 323 has a cam face so shaped and so positioned relative to the second capstan 15 that when the cam plate 323 is moved close towards the first capstan 14, the second capstan 15 can be shifted axially upwardly for the purpose which will be described later. However, the second capstan 15 is normally biased axially downwardly by a spring-loaded presser plate 323 biased by a biasing element such as, for example, a tension spring 324 so as to render the presser plate 323 to contact the upper end of the second capstan 15. With the second capstan 15 so biased by the tension spring 324, the lower end of the second capstan 15 is held in sliding contact with the cam face of the cam plate 323.

The biasing roller operable to push that portion of the length of magnetic recording tape 3 between the first and second capstans 14 and 15 to turn it around the first and second capstans 14 and 15 through the predetermined angle in the manner as hereinbefore described in connection with the foregoing embodiment of the present invention is supported in a manner best shown in FIG. 16. The biasing roller 16 has its opposite ends tapered so as to converge at a point axially outwardly therefrom as indicated by 16a and 16b, respectively, and is loosely rotatably supported by a roller holder 326 of a generally U-shaped configuration having upper and lower arms and angularly movably mounted on the chassis 13 by means of a pivot shaft 327. The upper and lower arms of the roller holder 326 have respective bearing recesses 326a and 326b defined therein so as to confront with each other, and the biasing roller 16 is supported by the roller holder 326 with the tapered ends 326a and 326b loosely received within the associated bearing recesses 326a and 326b. This support system is effective to minimize any possible frictional resistance which would otherwise acts on rotation of the biasing roller 16.

More specifically, each of the bearing recesses 326a and 326b defined in the respective upper and lower arms of the roller holder 326 has a bore size so chosen as to be slightly greater than the outer diameter of stems of the biasing roller 16 and, therefore, the position and/or posture of the biasing roller 16 can be controlled when the biasing roller 16 pulls that portion of the length of magnetic recording tape 3 out from the tape cassette 1 during the tape loading. It is to be noted that the stems of the tapered ends 16a and 16b of the biasing roller 16 are so positioned relative to and received within the bearing recesses 326a and 326b that, during the recording or reproducing mode in which information is recorded on or reproduced from the length of magnetic recording tape 3, the stems of the tapered ends 16a and 16b will not contact respective peripheral surfaces defining the bearing recesses 326a and 326b in the upper and lower arms of the roller holder 326. In other words, since the position of the biasing roller 16 is determined by the first and second capstans 14 and 15, the pivot shaft 327 for the roller holder 326 is so positioned on the chassis 13 that the respective stems of the tapered ends 16a and 16b will not contact the peripheral surface defining the associated bearing recesses 326a and 326b in the roller holder 326.

Figure 17:
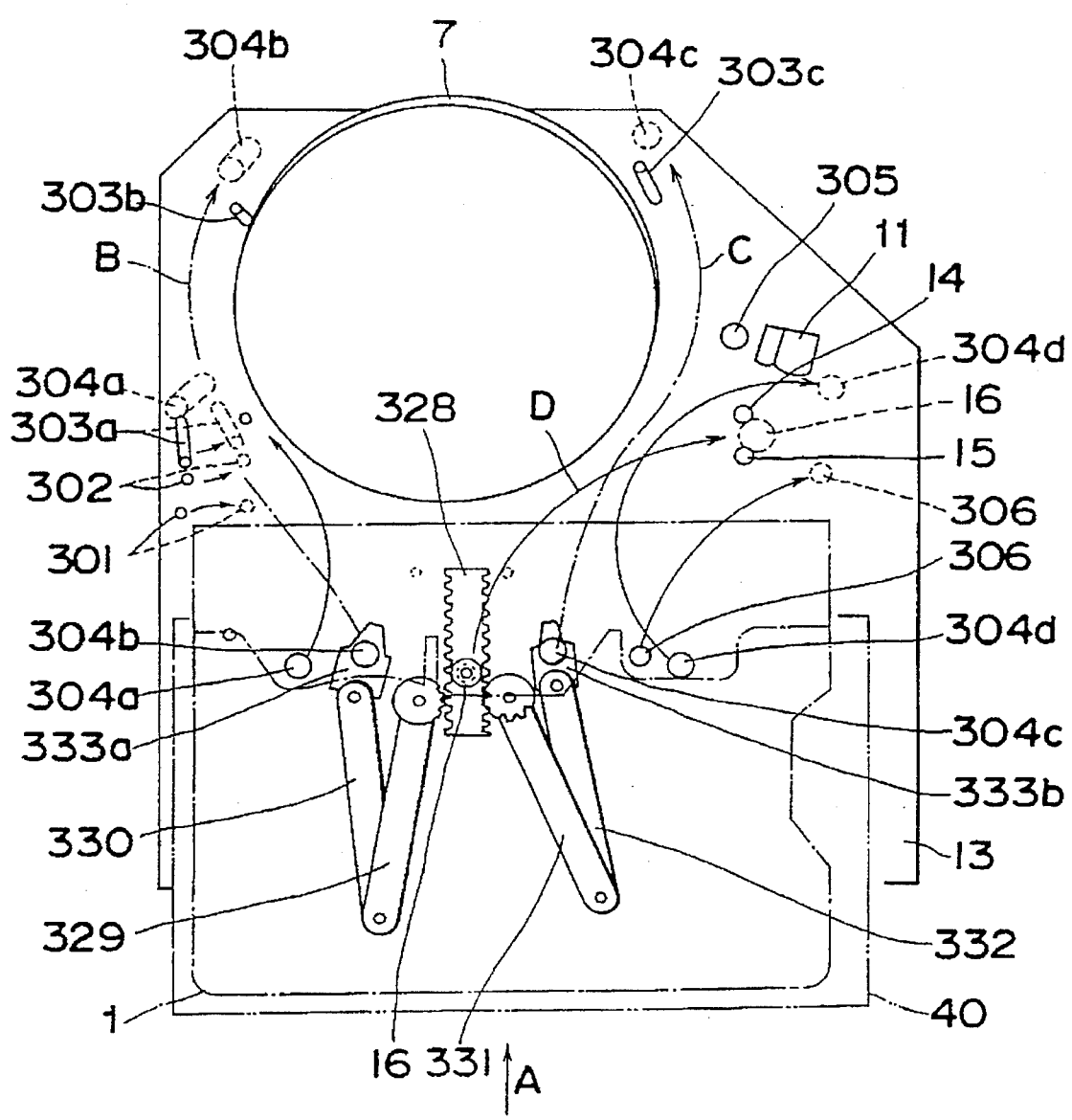
FIG. 17 is a schematic top plan view of the video tape player, showing the cassette loading mechanism used therein.

The tape loading mechanism that can be, though not exclusively, employed in the video tape player according to the second embodiment of the present invention is shown in FIG. 17. As discussed with reference to FIG. 5, the pivotally supported side lid 41 of the tape cassette 1 is automatically opened in response to mounting of the tape cassette 1 on the sub-chassis 40 and subsequent closure of the cover 38. Thereafter, the sub-chassis 40 carrying the tape cassette 1 is moved from the retracted position towards the inserted position either manually or automatically by means of a drive means (not shown) in a direction shown by the arrow A. A rack 328 having opposite side edges thereof formed with gear teeth is operatively coupled with loading arms 329 and 331 with the gear teeth engaged with gears on the associated loading arms 329 and 331 and can, therefore, be moved in a direction counter to the direction A in response to insertion of the sub-chassis 40 towards the inserted position. Accordingly, as the sub-chassis 40 is moved towards the inserted position, the loading arms 329 and 331 pivot clockwise and counterclockwise, respectively, to move post holders 333a and 333b, on which the movable guide posts 304b and 304c are mounted, respectively, along respective curved paths shown by the arrows B and C, thereby bringing the movable guide posts 304b and 304c to the respective positions shown by the solid lines in FIG. 11 or by the phantom lines in FIG. 17.

Simultaneously with movement of the movable guide posts 304b and 304c, the trailing and leading tension adjustment guide posts 301 and 306 and the movable guide posts 304a and 304d move to respective positions shown by the solid lines in FIG. 11 or by the phantom lines in FIG. 17, while depicting respective curved paths. Thus, that portion of the length of magnetic recording tape 3 situated within the tape cassette 1 adjacent the pivotally supported side lid 41 is drawn out of the tape cassette 1 and then turned around the rotary cylinder 7 in the manner known to those skilled in the art.

At the same time, the biasing roller 16 is moved from the rest position, shown by the solid line in FIG. 17, towards the biasing position in a direction shown by the arrow D while depicting a curved path and then traverses the space between the first and second capstans 14 and 15 a slight distance before the biasing roller 16 reaches the biasing position as shown in FIG. 13. In the second embodiment of the present invention, the space between the first and second capstans 14 and 15 is normally so chosen as to be slightly smaller than the outer diameter of the rubber-lined biasing roller 16. Accordingly, in order for the biasing roller 16 moving towards the biasing position to pass a slight distance across the space between the first and second capstans 14 and 15, the cam plate 323 is moved close towards the first capstan 14 in response to approach of the biasing roller 16 to the biasing position to shift the second capstan 15 axially upwardly against the biasing force of the tension spring 324.

Figure 18:
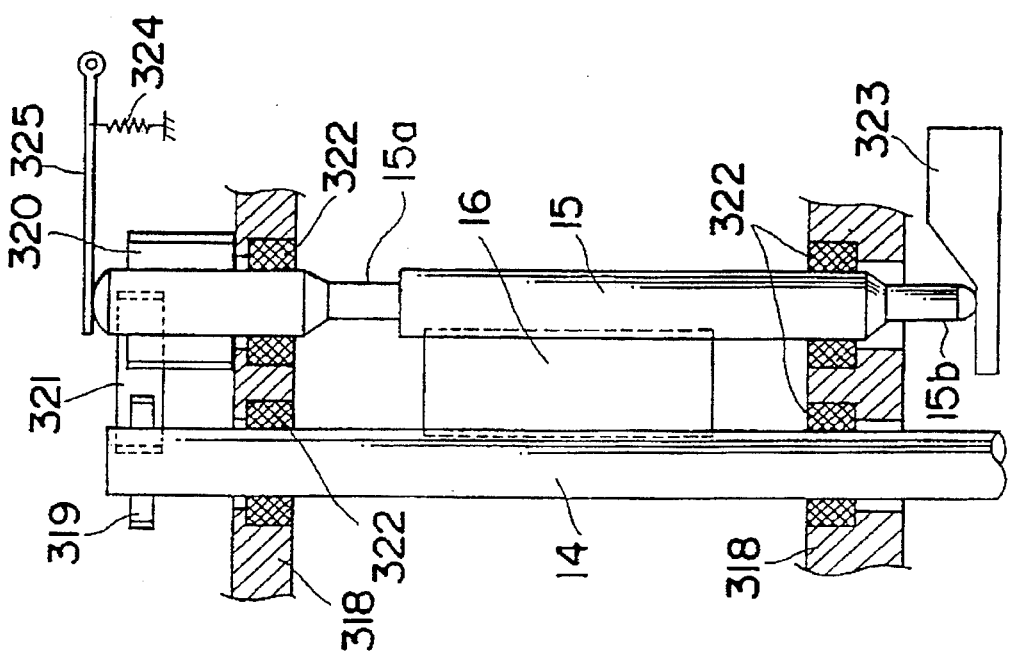
FIG. 18 is a view similar to FIG. 15, showing the tape transport mechanism in a different operative position.

Once the second capstan 15 is so shifted axially upwardly as described above until the annular escapements 15a and 15b in the second capstan 15 are aligned with the upper and lower arms of the roller holder 318, the thickness of the upper and lower arms of the roller holder 318 is accommodated within the annular escapements 15a and 15b, as shown in FIG. 18, permitting the second capstan 15 to displace laterally away from the first capstan 14 to thereby enlarge the space between the first and second capstans 14 and 15. The radial depth of each of the annular escapements 15a and 15b in the second capstan 15 is so chosen as to permit the space between the first and second capstans 14 and 15 to be enlarged to a value sufficient to allow passage of the biasing roller 16 therethrough to the biasing position. Thus, it is clear that, even though the space between the first and second capstans 14 and 15 is slightly smaller than the outer diameter of the rubber-lined biasing roller 16, the biasing roller can pass through such space once the second capstan 15 shifted axially upwardly displaces laterally in a direction away from the first capstan 14 in the manner described above.

Figure 19:
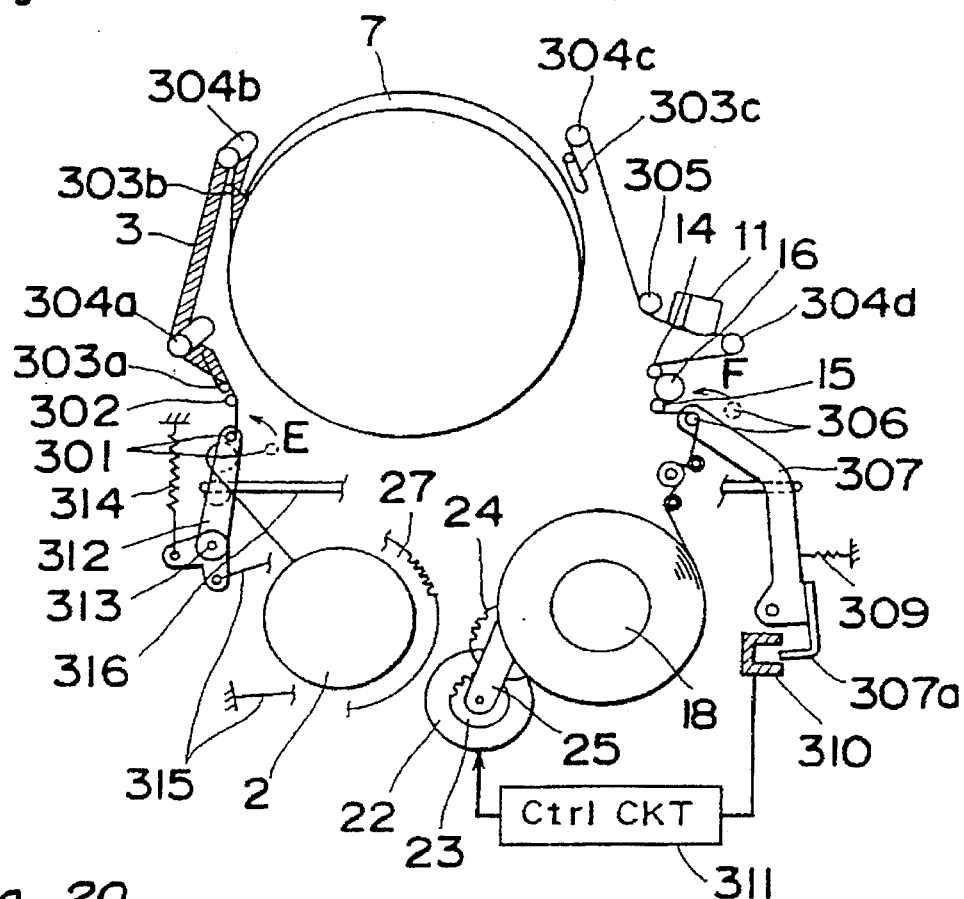
FIGS. 19 and 20 are schematic diagrams showing a tape tension control mechanism used in the video tape player in different operative positions, respectively.

Hereinafter, the manner in which the length of magnetic recording tape 3 is substantially completely taken up around the take-up reel 18, that is, the end of tape winding onto the take-up reel 18, is detected will be described. FIG. 19 illustrates the condition in which, during the recording or reproducing mode of the video tape player, the length of magnetic recording tape 3 has been substantially completely taken up around the take-up reel 18 with the trailing end of the length of magnetic recording tape 3 consequently exposed from the supply reel 2. In the condition shown in FIG. 19, the trailing tension detecting arm 312 carrying the trailing tension adjustment guide post 301 has been pivoted in a counterclockwise direction, shown by E, about the pivot pin 313 by the effect of the tension acting on the trailing end portion of the length of magnetic recording tape 3 which is then held taut. Counterclockwise pivot of the trailing tension detecting arm 312 so effected is transmitted to the connecting rod 316 to cause the latter to move leftwards as viewed in FIG. 19 and is therefore transmitted to the leading tension detecting arm 307.

Leftward displacement of the connecting rod 316 results in movement of the light intercepting member 307a rigid with the leading tension detecting arm 307 out of the light path between the light emitting and receiving elements of the photoelectric detector 310, allowing the entire quantity of light emitted by the light emitting element to be received by the light receiving element. The photoelectric detector 310 then issues an output signal proportional to the amount of light received by the light receiving element. The output signal from the photoelectric detector 310 is in turn supplied to the control circuit 311 which interrupts supply of the voltage to the direct current motor 22, thereby bringing the direct current motor 22 to a halt. After a predetermined length of time during which the direct current motor 22 is halted, the length of magnetic recording tape 3 substantially completely taken up around the take-up reel 18 is rewound onto the supply reel 2 by means of a reel rotation detecting means either partially or completely in a manner well known to those skilled in the art.

Figure 20:
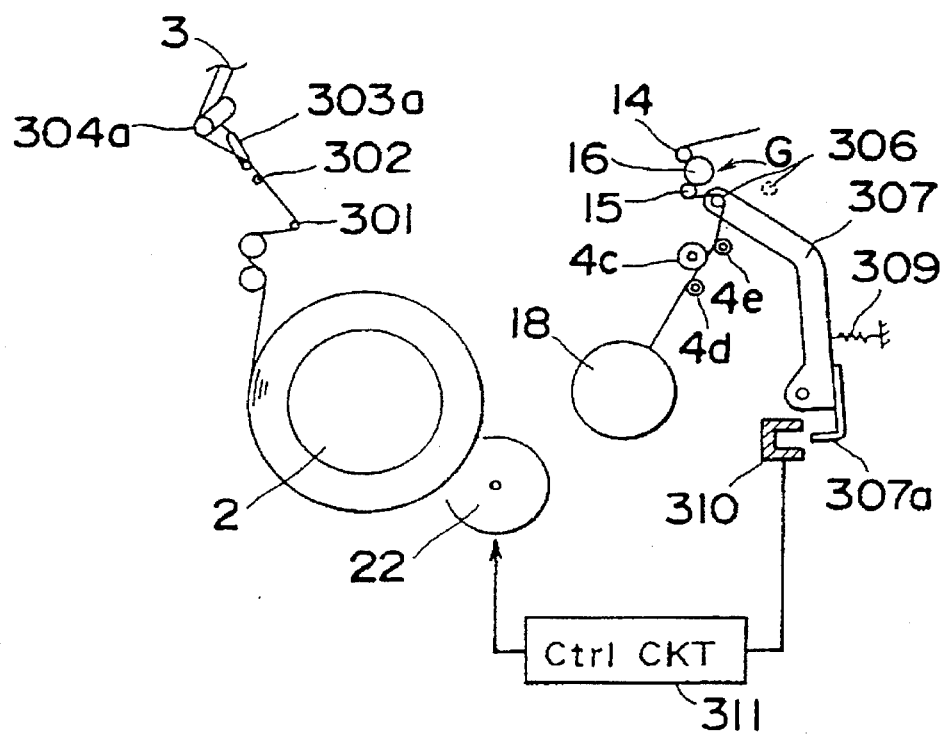

Movement of the connecting rod 316 in a direction counter to that described above, that is, rightward movement of the connecting rod 316, takes place when the length of magnetic recording tape 3 once taken up around the take-up reel 18 is substantially completely rewound onto the supply reel 2. The condition in which the length of magnetic recording tape 3 has been substantially completely rewound onto the supply reel 2 is shown in FIG. 20. As shown therein, the leading tension detecting arm 307 carrying the leading tension adjustment guide post 306 is pivoted counterclockwise (shown by the arrow G) about the pivot pin 308 against the tension spring 309 by the effect of the tension of the leading end portion of the length of magnetic recording tape 3 and, therefore, the light intercepting member 307a rigid with the detecting arm 307 is moved out of the light path in the photoelectric detector 310. Accordingly, in a manner similar to that occurring when the length of magnetic recording tape 3 has been substantially completely wound around the take-up reel 18, the direct current motor 22 is brought to a halt.

Figure 7:
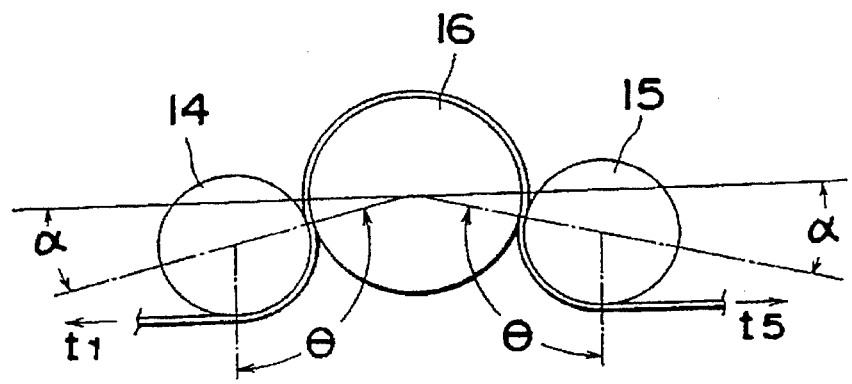
FIG. 7 is a schematic top plan view of the tape transport mechanism showing how first and second capstans and a biasing roller, forming respective parts of the tape transport mechanism, are positioned relative to each other.

The capstan drive system employed in the second embodiment of the present invention is characterized in that, when the tension of the portion of the length of magnetic recording tape 3 on the leading side with respect to the direction of transport thereof from the supply reel 2 towards the take-up reel 18, as indicated by $t_5$ in FIG. 7) becomes zero, the driving force $t_1$ also becomes zero even though any one of the first and second capstans 14 and 15 is being driven about its longitudinal axis. Accordingly, in the practice of the present invention, this feature is utilized to detect the end of tape winding onto the take-up reel 18 and also the end of tape rewinding onto the supply reel 2.

Third Preferred Embodiment

The third preferred embodiment of the present invention makes use of the tension control mechanism of a structure different from that employed in the second preferred embodiment of the present invention. In addition, instead of the use of the direct current motor 22 used to drive the take-up reel 18 in the foregoing embodiment of the present invention, the drive motor 317 coupled direct with the first capstan 14 is employed in the third embodiment of the present invention for driving the first capstan 14 in a manner which will now be described.

Figure 21:
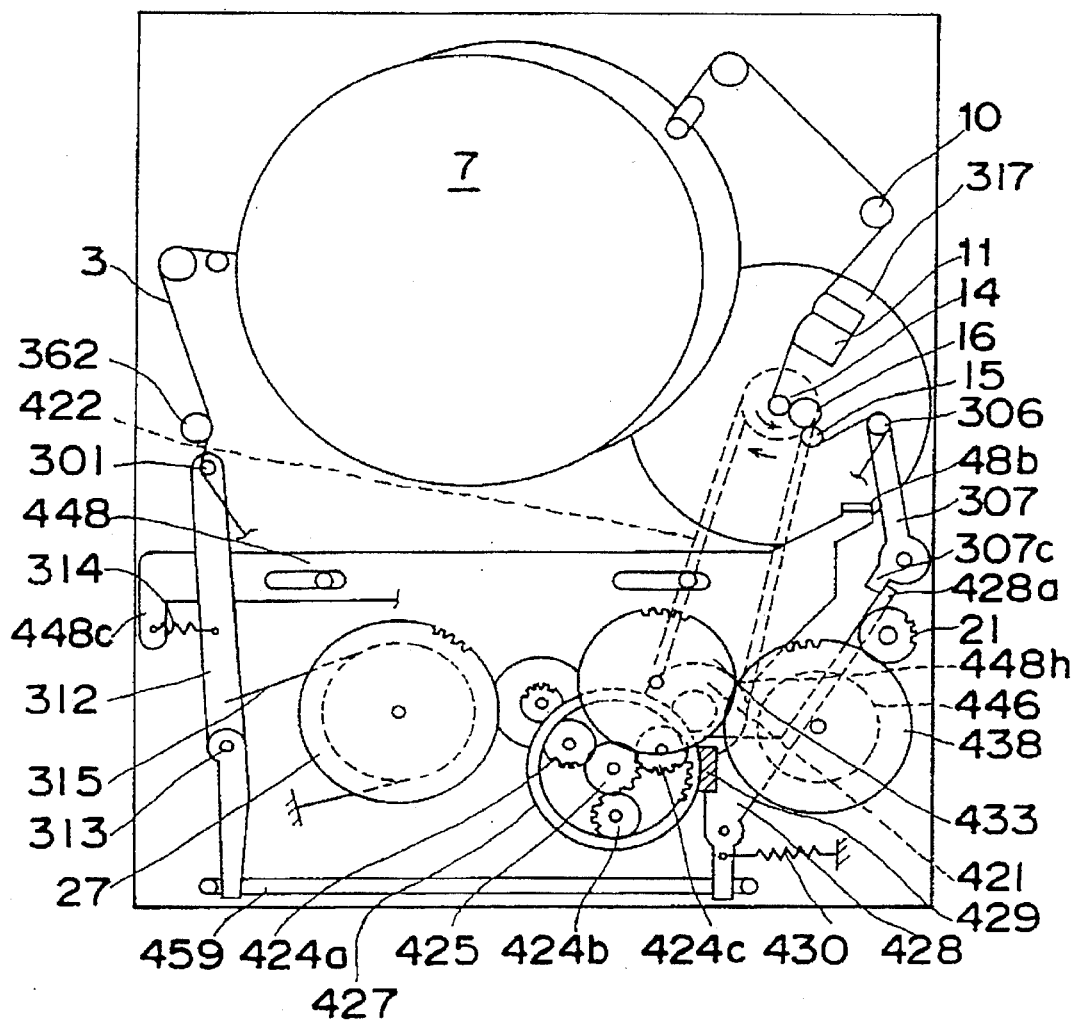
FIG. 21 is a schematic top plan view of the video tape player according to a third preferred embodiment of the present invention.
Figure 22:
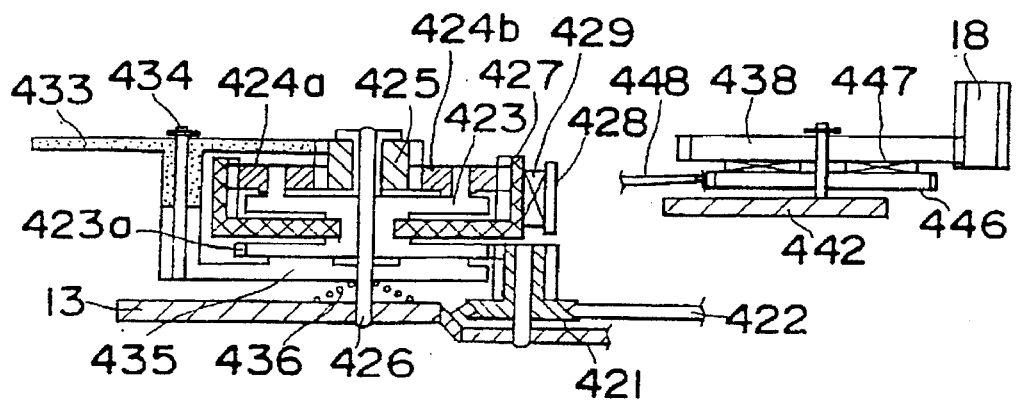
FIG. 22 is a schematic side sectional view showing the drive transmission system employed in the video tape player of FIG. 21.

Referring now to FIGS. 21 and 22, the drive motor 317 for driving the first capstan 14 has a drive pulley mounted on a drive shaft thereof for rotation together therewith, which pulley is drivingly coupled through an endless drive belt 422 with a relay pulley 421 mounted rotatably on the chassis 13. The relay pulley 42 has its outer periphery formed with gear teeth which are engaged with gear teeth 423a formed on an outer periphery of a generally disc-shaped link 423. The disc-shaped link 423 has a plurality of, for example, three, planetary gears 423a, 423b and 423c carried rotatably thereby so that, when the disc-shaped link 423 is driven by the drive motor 317 through the endless drive belt 422, the planetary gears 423a to 423c undergo revolution around a sun gear 425. The sun gear 425 is rotatably mounted on a spindle 426 which extends loosely through the disc-shaped link 423 and is then secured to the chassis 13.

The planetary gears 423a to 423c meshed with the sun gear 425 are also meshed with internal gear teeth of a ring gear 427 which is rotatably fitted to the disc-shaped link 423 as best shown in FIG. 22. A braking pad 429 mounted on a brake arm 428 pivotally mounted on the chassis 13 is frictionally engaged with an outer peripheral surface of the ring gear 427. More specifically, a biasing element such as, for example, a tension spring 430 is interposed between a first end of the brake arm 428 and the chassis 13 so that the brake arm 423 is normally pivoted in one direction by the tension spring 430 to allow the braking pad 429 to be held in sliding contact with the outer peripheral surface of the ring gear 427 at all times.

A second end 428a of the brake arm 428 opposite to the above mentioned first end thereof extends in a direction counter to the first end and terminates in engagement with a free end 307c of the leading tension detecting arm 307. Accordingly, when the leading tension detecting arm 307 is pivoted counterclockwise as viewed in FIG. 21 by the effect of the tension acting on the leading tension adjustment guide post 306 from the length of magnetic recording tape 3, the brake arm 428 is pivoted clockwise about a transverse axis of pivot thereof to reduce the frictional force applied from the braking pad 429 to the outer peripheral surface of the ring gear 427.

The sun gear 425 is engaged with an idler gear 433 that is rotatably mounted on a rotary shaft 434 provided at a radially outwardly protruding arm of a generally disc-shaped idler arm 435. A spring element 436 interposed between the disc-shaped idler arm 435 and the chassis 13 urges the disc-shaped idler arm 435 to contact the undersurface of the disc-shaped link 423 under a predetermined slight pressure. The idler gear 433 carried by the disc-shaped idler arm 435 is angularly moved together with rotation of the disc-shaped idler arm 435 between a first position, in which the idler gear 433 is brought into engagement with geared teeth formed on the supply hub 27 coaxial with the supply reel 2, and a second position in which the idler gear 433 is engaged with a relay gear 438.

The trailing tension detecting arm 312 carrying the trailing tension adjustment guide post 301 at one end thereof has one end mounted on the pivot pin 313 which is in turn mounted on a different chassis 442. This trailing tension detecting arm 312 is normally biased counterclockwise about the pivot pin 313 by the action of the tension spring 314. In the embodiment of the present invention shown in FIG. 21, the tension spring 314 is interposed between a left end 448c of a main connecting rod 448 and the trailing tension detecting arm 312. Also, as is the case with the second embodiment of the present invention, a portion of the trailing tension detecting arm 312 adjacent the pivot pin 313 is provided with the tensioning band 315 operable to apply a frictional force to the outer peripheral surface of the supply hub 27 drivingly engaged with the supply reel 2 so that a portion of the length of magnetic recording tape 3 extending outwardly from the supply reel 2 can be held under a predetermined tension regardless of a change in outer diameter of a roll of magnetic recording tape around the supply reel 2.

A clutch plate 446 is disposed beneath the relay gear 438, and the relay gear 438 is held in frictional contact with the clutch plate 446 through a felt pad 447 fixed to the undersurface of the relay gear 438. The clutch plate 446 is in the form of a rotary disc having its outer periphery formed with ratchet teeth. Accordingly, when the video tape player is set in the rewinding mode and the main connecting rod 448 is then moved rightwards in a manner as will be described later, a pawl 448h formed in the main connecting rod 448 is engaged with one of the ratchet teeth of the clutch plate 446 to regulate rotation of the clutch plate 446.

It is to be noted that the tension spring 314 interposed between the trailing tension detecting arm 312 and the left end 448c of the main connecting rod 448 is loosened when the main connecting rod 448 is moved rightwards during the rewinding mode of the video tape player, but is pulled taught in a manner as will be described later during the recording or reproducing mode of the video tape player.

Figure 23:
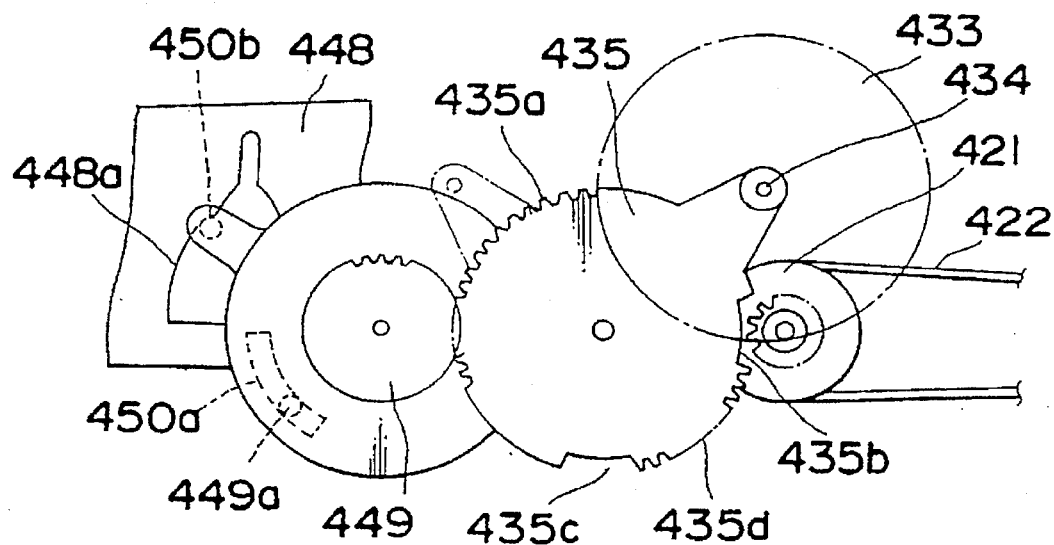
FIG. 23 is a schematic top plan view, on an enlarged scale, showing an idler arm mechanism used in the tape tension control mechanism shown in FIG. 22.
Figure 24:
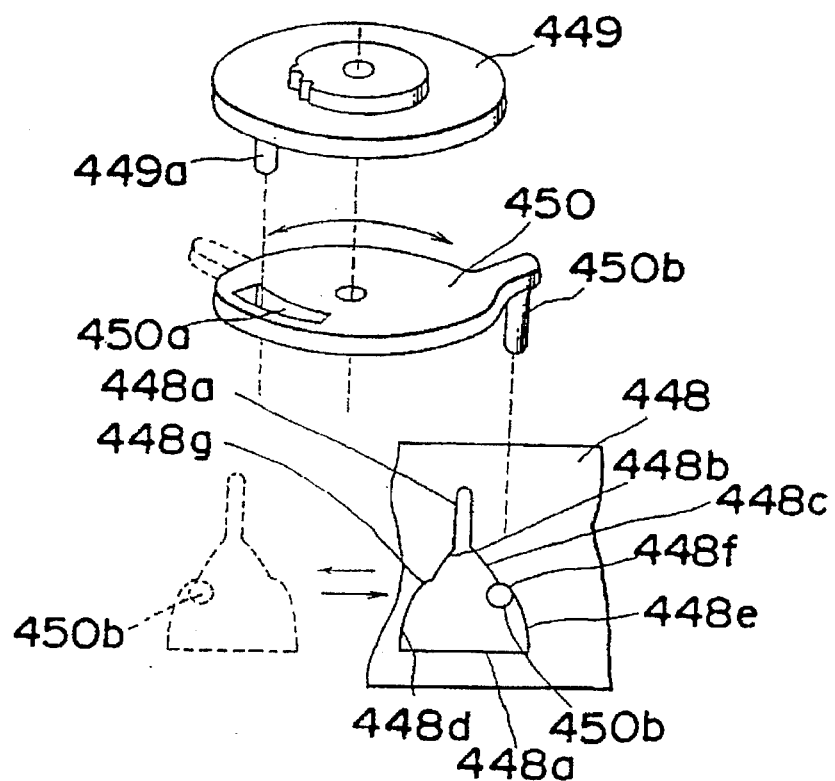
FIG. 24 is an exploded view of the idler arm mechanism shown in FIG. 23.

Referring to FIGS. 23 and 24, a mechanism for moving the main connecting rod 448 in a direction lengthwise thereof will now be described. As hereinbefore described, the idler gear 433 is angularly movable between the first position, in which the idler gear 433 is brought into engagement with geared teeth formed on the supply hub 27 coaxial with the supply reel 2, and a second position in which the idler gear 433 is engaged with the relay gear 438, in unison with the pivotal motion of the disc-shaped idler arm 435 about the spindle 426 through the predetermined angle. When this idler gear 433 is held at the second position, that is, engaged with the relay gear 438, the gear teeth of the relay pulley 421 are aligned with a first toothless cutout 435b defined in the outer peripheral portion of the idler arm 435 and, therefore, no rotational force will be transmitted from the relay pulley 421 to the idler arm 435. On the other hand, when the idler gear 433 is held at the first position, that is, engaged with the teeth in the supply hub 27, the gear teeth of the relay pulley 421 are aligned with a second toothless cutout 435 defined in the outer peripheral portion of the idler arm 435 and, therefore, no rotational force is similarly transmitted from the relay pulley 421 to the idler arm 435.

Gear teeth 435a formed on the outer peripheral portion of the idler arm 435 excluding the first and second toothless cutouts 435b and 435c are engaged with a reversing gear 449 at all times. A reversing disc 450 having an arcuate slot 450a defined therein is positioned beneath the reversing gear 449 in coaxial, but independently rotatable relation with the reversing gear 449, and a boss 449a integrally formed with the reversing gear 449 so as to extend downwardly therefrom is received within the arcuate slot 450a in the reversing disc 450. The reversing disc 450 is also formed with a boss 450b so as to extend downwardly therefrom, which boss 450b is engaged in a generally triangular hole defined in the main connecting rod 448 as will be described later.

With particular reference to FIG. 24, the triangular hole defined in the main connecting rod 448 is delimited by a generally elongated groove 448a extending perpendicular to the direction of movement of the main connecting rod 448; arcuate edges 448b and 448c each being of a shape occupying a respective portion of the circle of a predetermined diameter; arcuate edges 448d and 448e each being of a shape substantially occupying a respective portion of the circle of a diameter greater than the predetermined diameter of the circle occupied by the arcuate edges 448b and 448c, said arcuate edges 448d and 448e being continued from the arcuate edges 448b and 448c through shoulders 448g and 448f, respectively; and a base edge. This triangular hole is so shaped that the boss 450b fast with the reversing disc 450 can be caught or trapped by either one of the shoulders 448f and 448g when the main connecting rod 448 completes its leftward or rightward movement, respectively. At this time, the boss 449a fast with the reversing gear 449 occupies a position adjacent one end of the arcuate slot 450a in the reversing disc 450 as shown by the phantom line in FIG. 23 and, during this condition, both of the reversing gear 449 and the reversing disc 450 are freely rotatable to facilitate a smooth disengagement of the gear teeth of the relay pulley 421 from the gear teeth of the disc-shaped idler arm 435.

Figure 25:
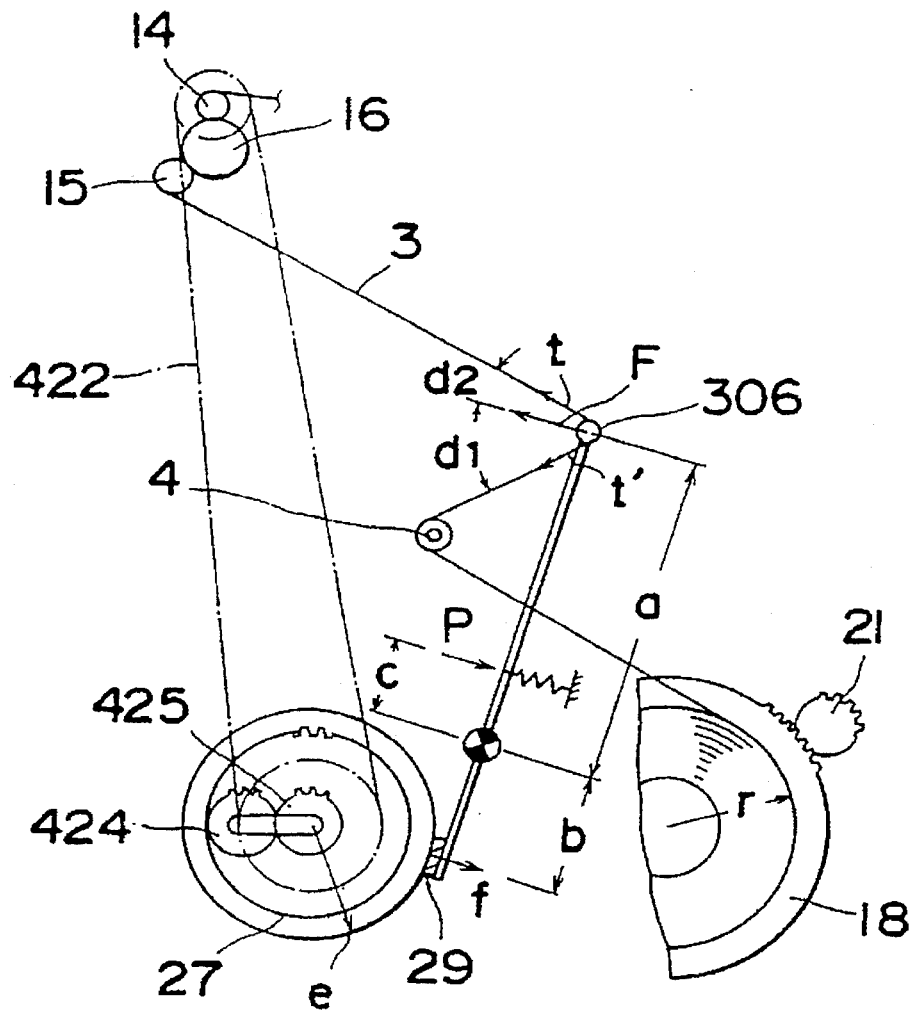
FIG. 25 is an explanatory diagram used to illustrate an operation of the tape tension control mechanism employed in the video tape player according to the third preferred embodiment of the present invention.

As hereinabove discussed, the video tape player according to the second preferred embodiment of the present invention makes use of the planetary gear mechanism including the sun gear 425, the planetary gears 424a to 424c and the ring gear 427. This planetary gear mechanism is operatively associated with a part of the tension control mechanism on a tape take-up side in the manner which will now be described with particular reference to FIG. 25. It is to be noted that, in FIG. 25, the planetary gear mechanism and that part of the tension control mechanism are schematically illustrated for the sake of brevity. For example, while the planetary gear mechanism in the illustrated embodiment includes the three planetary gears 424a to 424c, only one of them, that is, a planetary gear 424, is shown in FIG. 25 for the purpose of discussion.

Figure 31:
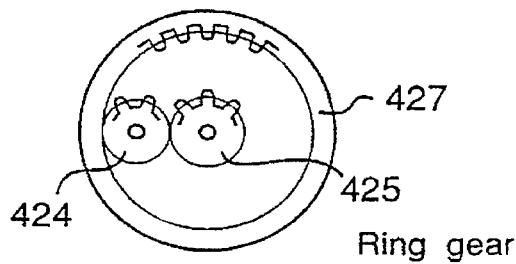
FIG. 31 is a diagram showing various modes of rotation of gears forming the planetary gear mechanism.

Numbers of revolutions of and directions of revolution of the various gears forming the planetary gear mechanism are shown in FIG. 31. In FIG. 31, z1 represents the number of internal teeth of the ring gear 427, z2 represents that of the sun gear 425, z3 represents that of the planetary gear 424, and n represents an arbitrarily chosen number. FIG. 31 also illustrates the case (1) in which all of the planetary gears are permitted to undergo one complete rotation, the case (2) in which the ring gear 427 is permitted to undergo one complete rotation with the disc-shaped link 423 fixed in position, and the case (3) in which values in the case (2) multiplied by n are added to corresponding values in the case (1). In the case (3) shown in FIG. 31, it will readily be seen that, when the disc-shaped link 423, the ring gear 427, the sun gear 425 and the planetary gear 424 undergo (1+n), (1−n·z1/z2) and (1+n·z1/z3) rotation, respectively.

Figure 32:
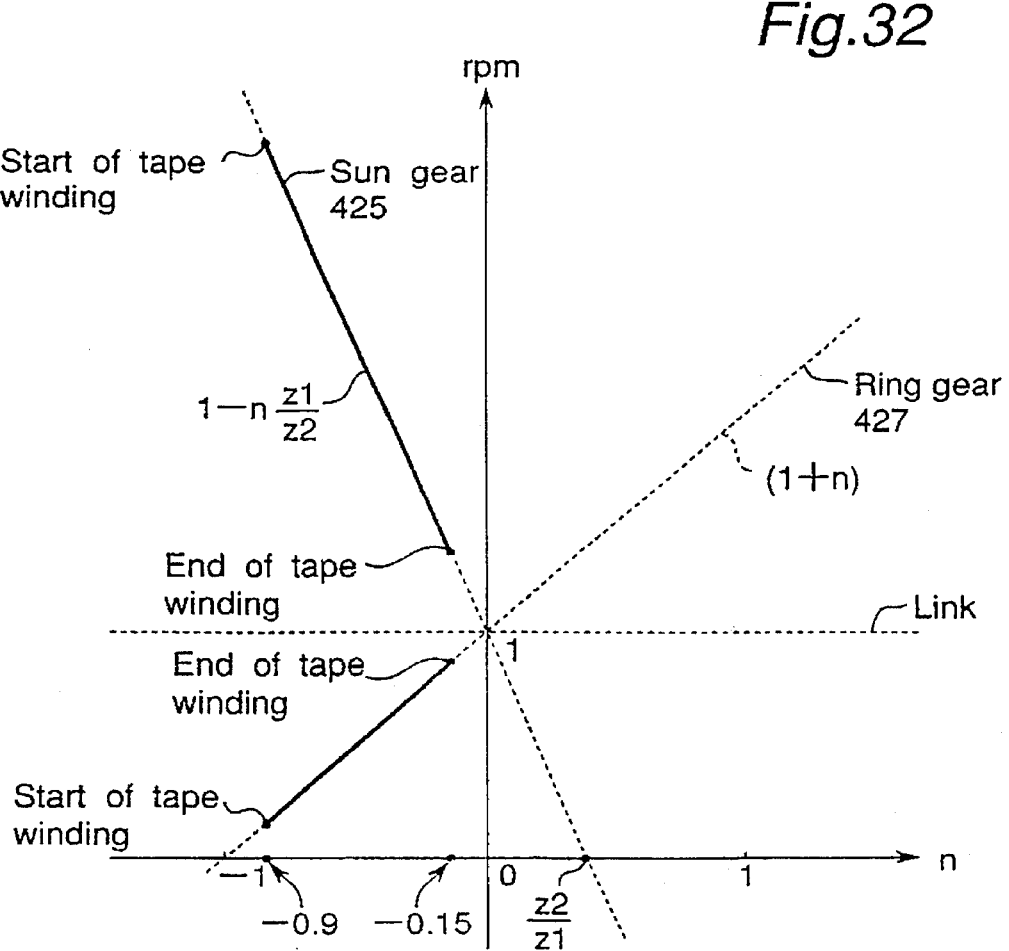
FIG. 32 is a graph showing a change in speed (rpm) of rotation of the various gears forming the planetary gear mechanism.
Figure 33:
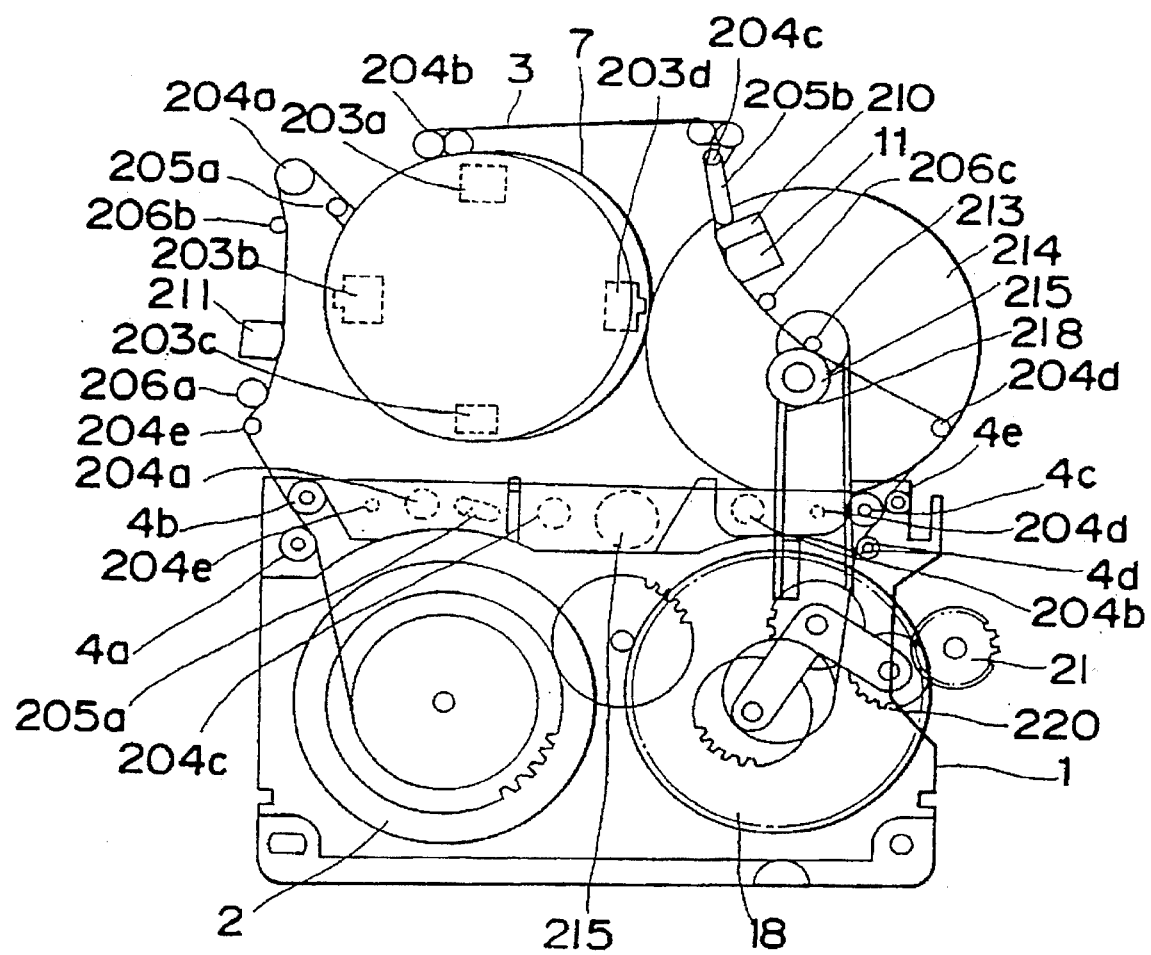
FIG. 33 is a schematic top plan view of a prior art video tape player.

A specific example will now be discussed in which z1 (the number of teeth of the ring gear 427), z2 (the number of teeth of the sun gear 425) and z3 (the number of teeth of the planetary gear 424) are assumed to be 51, 18 and 16, respectively. A change in number of revolution of each of these gears is shown in FIG. 32 in which the axis of abscissas represents the arbitrarily chosen number n and the axis of ordinates represents the number of revolution of each of the gears forming the planetary gear mechanism. Since the number of revolution of the sun gear 425 is proportional to the number of revolution of the take-up reel 18, the number of revolution progressively decreases as the length of magnetic recording tape 3 is taken up around the take-up reel 18, accompanied by an increase in number of revolution of the ring gear 425 to which the braking pad 429 is frictionally engaged. Also, the disc-shaped link 423 is driven at a predetermined speed at all times since it is driven by the drive motor 317 through the relay pulley 421 by way of the endless drive belt 422. While it is recommend to choose a value greater than −1 for the parameter n and, also, 0.85 for the division z2/z1, the number of revolution of the ring gear 427 should be of a rather smaller value in order to minimize a frictional loss brought about by the braking pad 429. Accordingly, −0.9 is preferred for the parameter n at the start of tape winding.

Hereinafter, the manner in which that part of the tension control mechanism detects the tension t of that portion of the length of magnetic recording tape 3 extending between the second capstan 15 and the take-up reel 18 will be discussed with particular reference to FIG. 25.

In view of the tensions t and t', the force F acting on the leading tension adjustment guide post 306 is expressed by the following equation.

$$F = t' \cos \alpha_1 + t \cos \alpha_2 = t(\eta^* \cos \alpha_1 + \cos \alpha_2) \tag{22}$$

wherein η* represents a transport loss of the magnetic recording tape 3, that is, a frictional loss brought about by a frictional contact between the length of magnetic recording tape 3 and the leading tension adjustment guide post 306. In this specific example, the travel loss of the magnetic recording tape 3 is not taken into consideration with η* set to be 1, and also, neither axis loss nor transmission loss of the gears is taken into consideration.

From the balancing condition of moment acting on the leading tension detecting arm 307, the following relationship can be obtained.

$$f \cdot b = P \cdot c - F \cdot a \qquad (23)$$

wherein f represents the force applied from the braking pad 429 to the outer peripheral surface of the ring gear 427, b represents the distance between the axis of pivot of the leading tension detecting arm 307 and the point at which the force f acts, P represents a spring force exerted by the tension spring, c represents the distance between the axis of pivot of the leading tension detecting arm 307 and the point at which the spring force P acts, and a represents the distance between the axis of pivot of the leading tension adjustment guide post 306 and that of the leading tension detecting arm 30.

Modifying the equation (23) with respect to the force f results in:

$$f = (P \cdot c - F \cdot a)/b \qquad (24)$$

Inserting the equation (22) into the equation (24) results in:

$$f = (c/b) \cdot P - (a/b) \cdot t(\cos \alpha_1 + \cos \alpha_2) \qquad (25)$$

Figure 26:
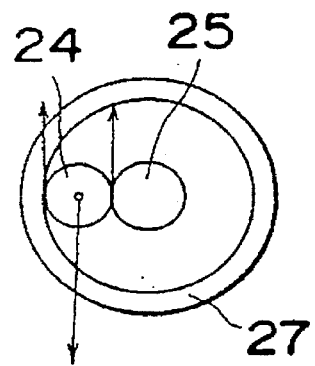
FIG. 26 is a schematic top plan view of a planetary gear mechanism used in the tape tension control mechanism shown in FIG. 25.

From the equation (25) above, the torque $\phi_1$ acting on the internally threaded ring gear 427 is expressed by the following equation.

$$\phi_1 32 f \cdot e \cdot \mu \qquad (26)$$

wherein e represents the half value of the outer diameter of the ring gear 427, and $\mu$ represents a coefficient of friction of the braking pad 429. A relationship with the force acting on the planetary gear 424 is shown in FIG. 26. Since the force acting on the teeth engaged with the ring gear 427 and the force acting on the teeth engaged with the sun gear 425 are equal to each other, the torque $\phi_2$ acting on the sun gear 425 is expressed by the following equation.

$$\phi_2 = z2/z2 \cdot \phi_1 \qquad (27)$$

Assuming that the ratio of reduction in speed from the sun gear 425 to the take-up reel 18 is $\xi$ and the outer diameter of the roll of magnetic recording tape around the take-up reel 18 is r, the rotational torque acting on the take-up reel 18 is equal to the rotational torque $\phi_2$ multiplied by the reduction gear ratio $\xi$ and, therefore, the following relationship can be obtained.

$$t \cdot r = f \cdot e \cdot \mu \cdot z2/z1/\xi \qquad (28)$$

Inserting the equation (25) into the equation (28) results in:

$$t \cdot r = \{c/b \cdot P - a/b \cdot t(\cos \alpha_1 + \cos \alpha_2)\} \cdot e \cdot \mu \cdot z2/z1/\xi \qquad (29)$$

Solving the equation (29) above to give the tape tension t result in:

$$t = \frac{c/b \cdot P \cdot e \cdot \mu \cdot z2/z1/\xi}{r + a/b \cdot (\cos \alpha_1 + \cos \alpha_2) \cdot e \cdot \mu \cdot z2/z1/\xi} \qquad (30)$$

In order to determine the controllability of the take-up tension of the magnetic recording tape, let it be assumed that the radius of the roll of magnetic recording tape taken up around the take-up reel 18 at the start of winding of the length of magnetic recording tape around the take-up reel 18 and that at the end of winding thereof around the take-up reel 18 are expressed by rs and re, respectively. Then the following equation can be obtained:

$$\frac{ts}{te} = \frac{re + a/b \cdot (\cos \alpha_1 + \cos \alpha_2) \cdot e \cdot \mu \cdot z2/z1/\xi}{rs + a/b \cdot (\cos \alpha_1 + \cos \alpha_2) \cdot e \cdot \mu \cdot z2/z1/\xi} \qquad (31)$$

The number of revolution of each of the ring gear 427, the sun gear 425 and the link 423 will now be determined.

The number of revolution $\omega 2$ of the sun gear 425 is given by the following equation.

$$\omega 2 = V/(2\pi r)/\xi \qquad (32)$$

wherein V represents the speed of travel of the length of magnetic recording tape 3. From FIG. 31, the numbers of revolution $\omega 1$ and $\omega r$ of the ring gear 427 and the disc-shaped link 23, respectively, are given by the following equations.

$$\omega 1 = \omega 2 \cdot (1+n)/(1-n \cdot z1/z2) \qquad (33)$$

$$\omega r = \omega 2/(1 - n \cdot z1/z2) \qquad (34)$$

Inserting the equation (32) into the equation (34) results in:

$$\omega r = V/(2\pi r)/\xi/(1 - n \cdot z1/z2) \qquad (35)$$

Accordingly, the ratio $\xi'$ of reduction in speed between the drive motor 317 and the disc-shaped link 423 is given by the following equation wherein $\omega 0$ represents the number of revolution of the drive motor 317.

$$\xi' = \omega r/\omega 0 \qquad (36)$$

and, if the diameter of the first capstan 14 is expressed by d0, then, the reduction gear ratio $\xi'$ results in:

$$\begin{aligned}\xi' &= \{V/(2\pi r)/\xi/(1 - n \cdot z1/z2)\}/\{V/(d \cdot \pi)\} \\ &= (d/\xi)/\{2 \cdot r \cdot (1 - n \cdot z1/z2)\}\end{aligned} \qquad (37)$$

Figure 27:
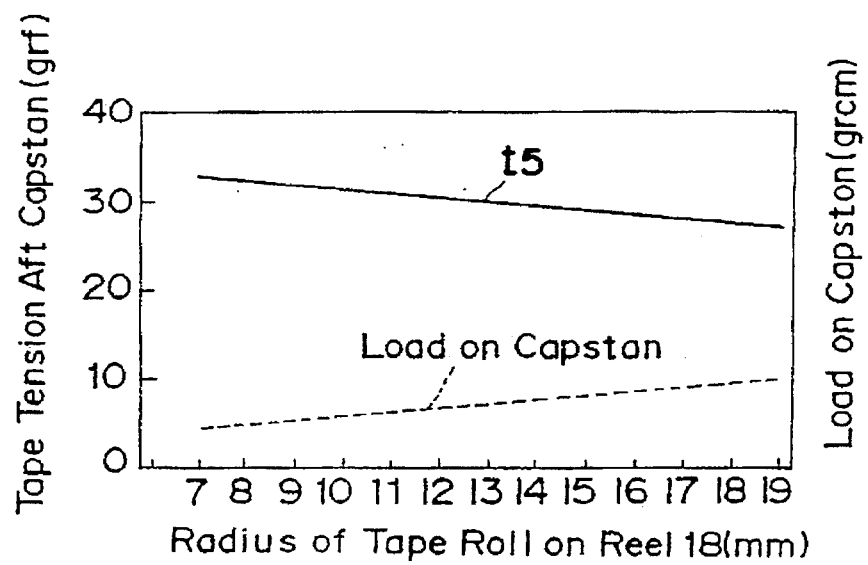
FIG. 27 is a graph showing a control characteristic exhibited by the tape tension control mechanism.

FIG. 27 illustrates a result of calculation performed to determine the radius of the roll of magnetic recording tape around the take-up reel 18, the tension $t_s$ and the load imposed on the first capstan 14. As shown in the graph of FIG. 27, the tension t substantially remains at 30 grf and the load on the first capstan 14 increases with increase of the radius of the roll of magnetic recording tape around the take-up reel 18. Where the tension t of that portion of the length of magnetic recording tape 3 is fixed regardless of the radius of the roll of magnetic recording tape around the take-up reel 18, it is a general practice for the prior art video tape player to employ a drive motor exclusively dedicated for the take-up reel and this has resulted in increase of the manufacturing cost and also in increase of the electric power consumption. Also, the prior art video tape player has another problem in that, where the use of tension detecting arms and braking members, both not shown, is made to control the clutch torque generated by the take-up drive gear 21 so that the tension of the length of magnetic recording tape being taken up around the take-up reel can be controlled to a predetermined value, the clutch torque generated by the take-up drive gear 21 must be increased by a value corresponding to that lost by the braking members. Consequently, in the prior art video player, the load imposed on the capstan drive motor tends to increase and, therefore, the system of the present invention is superior to the prior art system in respect of the minimized electric power consumption and the reduced manufacturing cost.

The video tape player according to the third embodiment of the present invention operates in the following manner.

Assuming that the video tape player is set in the rewinding mode in which the length of magnetic recording tape 3 once taken up around the take-up reel 18 is rewound from the take-up reel 18 back to the supply reel 2, the drive motor 317 is driven clockwise as viewed in FIG. 21. Then, by the action of a frictional force developed by the spring element 436 between the disc-shaped link 423 and the disc-shaped idler arm 435, the disc-shaped idler arm 435 is rotated counterclowise as viewed in FIG. 23. As a result thereof, the teeth of the relay pulley 421 then aligned with the first toothless cutout 435b in the disc-shaped idler arm 435 are brought into engagement with the teeth of the disc-shaped idler arm 435 and, therefore, the drive force of the drive motor 317 transmitted through the endless drive belt 422 is transmitted to the disc-shaped idler arm 435.

When by the effect of the drive force of the drive motor 317 the disc-shaped idler arm 435 is rotated counterclockwise, the reversing gear 449 engaged with the disc-shaped idler arm 435 is rotated clockwise. As a result thereof, the boss 450b fast with the reversing gear 449 is angularly displaced in a clockwise direction, resulting in a rightward displacement of the main connecting rod 448. Consequently, the right end 448b of the main connecting rod 448 is brought into abutment with the leading tension detecting arm 307 to cause the end 307c of the leading tension detecting arm 307 to separate away from the brake arm 428.

On the other hand, consequent upon rightward displacement of the main connecting rod 448, the tension spring 314 acting to bias the main connecting rod 448 in the rightward direction as viewed in FIG. 21 is slackened and, therefore, the pawl 448h of the main connecting rod 448 is brought into engagement with the ratchet teeth of the clutch plate 446 to regulate rotation of the clutch plate 446. Thus, although the relay gear 438 is tended by the effect of the tension of the length of magnetic recording tape 3 being rewound, to rotate independently of the clutch plate 446 through the hub 27 engaged with the take-up reel 18, intervention of the felt pad 447 between the relay gear 438 and the clutch plate 446 is effective to impose a load on rotation of the take-up reel 18.

Upon completion of the rightward movement of the main connecting rod 448, the teeth of the relay pulley 421 are brought into alignment with the second toothless cutout 435c in the disc-shaped idler arm 435 to assume the first position at which the idler gear 433 is engaged with the teeth of the hub engaged with the supply reel 2 to cause the latter to rotate counterclockwise as viewed in FIG. 21. In this way, the length of magnetic recording tape 3 is rewound onto the supply reel 2.

As hereinbefore discussed, the trailing tension detecting arm 312 carrying the trailing tension adjustment guide post 301 is pivoted clockwise about the pivot pin 313 by the effect of the tension of the length of magnetic recording tape 3 being rewound onto the supply reel 2. Since the end of the trailing tension detecting arm 312 opposite to the end on which the trailing tension adjustment guide post 301 is mounted is connected with the brake arm 428 through the connecting rod 459, the pressure applied from the braking pad 429, carried by the brake arm 428, to the outer peripheral surface of the ring gear 427 decreases with increase of the tension of the length of magnetic recording tape 3 being rewound which acts on the trailing tension adjustment guide post 301 and, consequently, the torque once acting on the hub 27 for the supply reel 2 from the braking pad 429 through the planetary gear mechanism decreases. Accordingly, the tension of the length of magnetic recording tape 3 being rewound onto the supply reel 2 is maintained substantially at the predetermined value.

In the prior art video tape player, since the rewinding of the length of magnetic recording tape during the rewinding mode is carried out by relying on the clutch mechanism, the tension of the length of magnetic recording tape being rewound tends to vary considerably with increase of the diameter of the roll of magnetic recording tape around the supply reel. For this reason, the tension acting on the length of magnetic recording tape is undesirably high at the end of tape winding at which the diameter of the roll of magnetic recording tape is relatively small, and, therefore, there is a possibility that the magnetic recording tape may be damaged. Therefore, the torque rest be suppressed by the use of the clutch mechanism. Conversely, if the diameter of the roll of magnetic recording tape is relatively great, the tension of the length of magnetic tape is so low that the length of magnetic recording tape will not contact the heads in a stabilized fashion, accompanied by reduction in reproduction output, and therefore, setting of the clutch torque has been difficult to achieve. The present invention is effective to substantially eliminate these problems as well.

Modifications

In the first embodiment of the present invention, the first capstan 14 has been described as driven by the drive motor built in the rotary cylinder 7 through the endless drive belt 30. Also, in the second and third embodiment of the present invention, the direct drive system has been shown as employed to drive the first capstan 14 and then the second capstan 15 drivingly coupled with the first capstan 14 through the gears. However, in a modified form of the tape transport mechanism shown in FIGS. 28 to 30B, although the direct drive system similar to that employed in any one of the second and third embodiments of the present invention is employed, transmission of a driving force of the first capstan 14 to the second capstan 15 is carried out by an endless transmission belt in a manner which will now be described in details.

Figure 28:
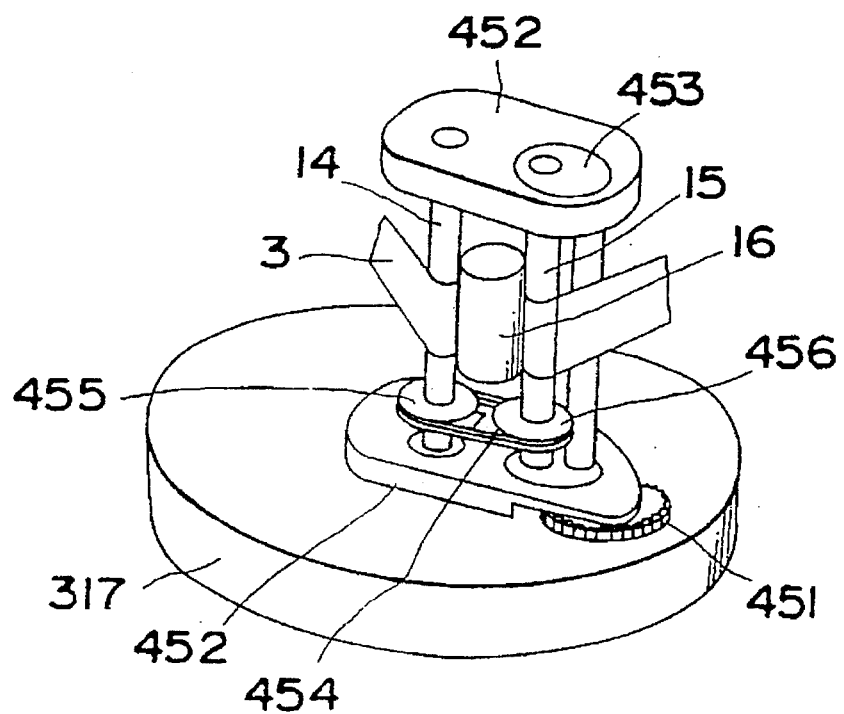
FIG. 28 is a schematic perspective view showing a modified form of the support mechanism for support of the first and second capstans and the biasing roller.
Figure 29:
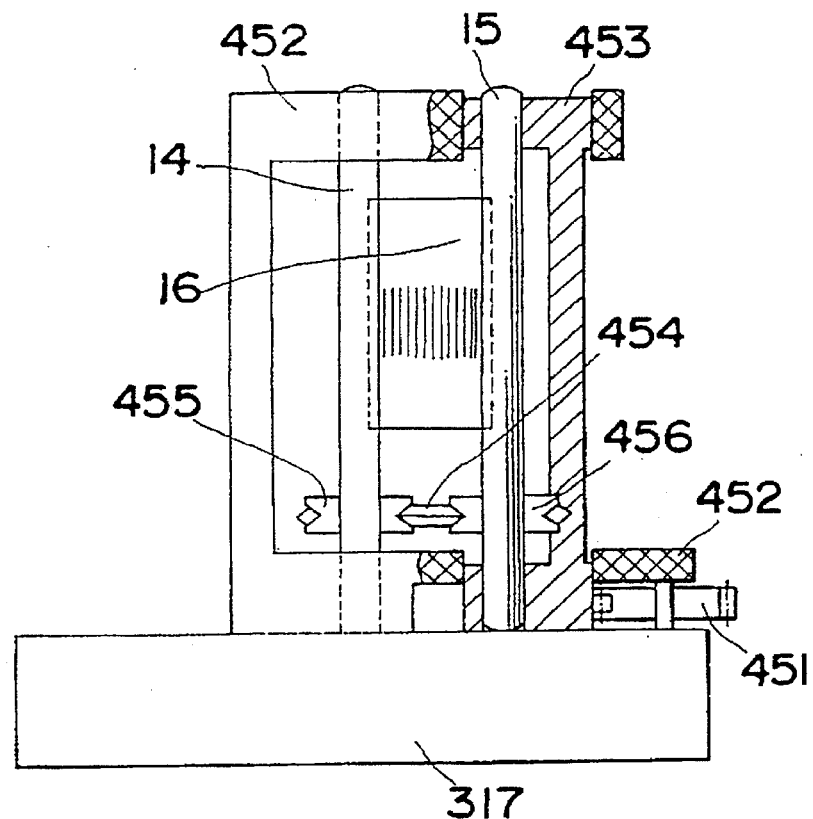
FIG. 29 is a schematic side sectional view, on an enlarged scale, of the support mechanism shown in FIG. 28.

Referring first to FIGS. 28 and 29, a housing of the drive motor 317 has a capstan holder 452 mounted thereon with a portion of the chassis 13 intervening therebetween. The capstan holder 452 is of a generally U-shaped configuration including upper and lower arms between which the first and second capstans 14 and 15 are rotatably supported in side-by-side fashion. The first capstan 14 is drivingly coupled, or otherwise formed integrally, with the drive shaft of the drive motor 317 and is, after having rotatably passed through the lower arm of the capstan holder 452, journalled at an upper end by the upper arm of the capstan holder 452.

Figure 30A:
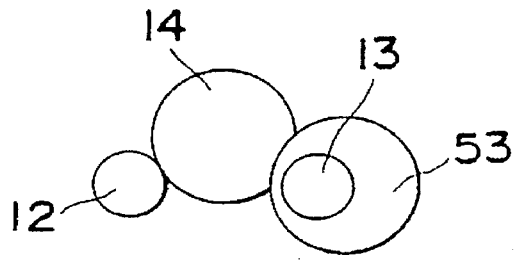
FIGS. 30A and 30B are schematic diagrams showing how the second capstan supported by the support mechanism shown in FIGS. 28 and 29 is moved selectively to two different positions, respectively.
Figure 30B:
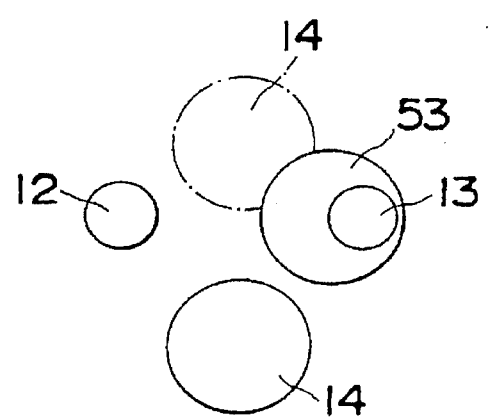

The second capstan 15 extends parallel to the first capstan 14 and is supported for lateral movement in a direction transverse of the longitudinal axis thereof to selectively enlarge and reduce the space between the first and second capstans 14 and 15. For this purpose, the second capstan 15 has its opposite ends rotatably received by respective eccentric holder pieces 453 with its longitudinal axis offset laterally from the axis of rotation of each of the eccentric holder pieces 453. The eccentric holder pieces 453 are adapted to be driven by a gear wheel 451 rotatable in synchronism with drawing of that portion of the magnetic recording tape 3 out of the tape cassette 1 to move the second capstan 15 between a separated position, as shown in FIG. 30B, and an operative position as shown in FIG. 30A.

The first and second capstans 14 and 15 are adapted to be driven by the drive motor 317 by means of an endless drive belt 454 trained between pulleys 455 and 456 fixedly mounted respectively on the first and second capstans 14 and 15. It should, however, be noted that the pulleys 455 and 456 have a respective different diameter so chosen that the second capstan 15 can be driven at a peripheral speed slightly higher than that of the first capstan 14.

The rubber-lined biasing roller 16 is supported by the roller holder 326 in a manner similar to that described in connection with the foregoing embodiment (FIG. 16) and is movable from the rest position towards the biasing position in response to drawing of that portion of the magnetic recording tape 3 out of the tape cassette 1. As hereinbefore described, as the biasing roller 16 approaches the biasing position, the biasing roller 16 moves across the space between the first and second capstans 14 and 15. Even though the biasing roller 16 has an outer diameter slightly greater than the minimum distance between the first and second capstans 14 and 15, the biasing roller 16 can move past the space between the first and second capstans 14 and 15 because at this time the eccentric holder pieces 453 carried by the capstan holder 452 are rotated to bring the second capstan 15 to the separated position at which the second capstan 15 is separated from the first capstan 14 a distance sufficient to allow the biasing roller 16 then approaching the biasing position to pass freely across the space between the first and second capstans 14 and 15.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A magnetic recording and/or reproducing apparatus operable with a tape cassette including spaced apart tape supply and take-up reels and a length of magnetic recording tape having its opposite ends anchored to the tape supply and take-up reels, respectively, said apparatus comprising:

a head carrier carrying at least one magnetic transducer head;

first and second hubs adapted to be engaged with the tape supply and take-up reels, respectively, when the tape cassette is loaded in the apparatus;

a guide means operable, when the tape cassette is loaded in the apparatus with the tape supply and take-up reels engaged with the first and second hubs, to selectively draw and withdraw a first tape portion of the length of magnetic recording tape extending between the tape supply and take-up reels out of and into the tape cassette to thereby bring that first tape portion to an operative position, at which the length of magnetic recording tape is held in sliding contact with the head carrier, and to a withdrawn position at which the first tape portion is accommodated within the tape cassette, respectively;

a tape transport mechanism including:

first and second capstans extending parallel to each other and defining an operative space therebetween;

a drive means for driving at least said first capstan about a longitudinal axis of said first capstan;

a capstan support member carrying at least the second capstan for movement between a first position, at which said second capstan is separated a first predetermined distance from the first capstan, and a second position at which said second capstan is separated a second predetermined distance from the first capstan which is slightly greater than said first predetermined distance;

a roller element normally held at a retracted position when the first tape portion is held in the withdrawn position within the tape cassette, but movable to a biasing position when the first tape portion is drawn to the operative position, said biasing position being defined at a location on one side of the operative space opposite to the retracted position of the roller element and spaced a slight predetermined distance from the operative space, said roller element having an outer diameter slightly greater than said first predetermined distance, but smaller than the second predetermined distance; and a pivotable support member for rotatably carrying the roller element and pivotable to move the roller element between the retracted and biasing positions;

whereby as the roller element approaches the biasing position, said second capstan is moved to the second position to allow passage of the roller element across the operative space between the first and second capstans to urge a portion of the magnetic recording tape traversing the operative space to be turned a predetermined angle around each of the first and second capstans.

2. The apparatus as claimed in claim 1, wherein said first and second capstans have an equal diameter.

3. The apparatus as claimed in claim 2, wherein said second capstan is driven at a speed slightly higher than the first capstan.

4. The apparatus as claimed in claim 1, wherein said second capstan has a diameter greater than the first capstan.

5. The apparatus as claimed in claim 4, wherein said first and second capstans are driven at an equal speed.

6. The apparatus as claimed in claim 1, further comprising a drive transmission element for transmitting rotation of the first capstan by said drive means to the second capstan.

7. The apparatus as claimed in claim 1, wherein said roller element comprises a rubber-lined roller having first and second ends opposite to each other, and wherein said pivotable support member is a roller holder of a generally U-shaped configuration having first and second arms each having a bearing hole defined therein of a diameter greater than that of any one of the opposite ends of the roller element, said roller element being supported by the roller holder with the opposite ends thereof loosely accommodated within the respective bearing holes.

8. The apparatus as claimed in claim 1, wherein said pivotable support member comprises a pivotable arm, said roller element being rotatably mounted at one end on said pivotable arm.

9. The apparatus as claimed in claim 1, wherein said capstan support member comprises a capstan holder of a generally U-shaped configuration having first and second arms and each of said first and second capstans is journalled to the first and second arms, and wherein said second capstan has radially inwardly depressed annular escapements defined at respective portions of the second capstan axially inwardly of the opposite ends thereof, each of said annular escapements having an axial width corresponding to a thickness of each of the first and second arms, and further comprising a cam member operable to shift the second capstan axially when said second capstan approaches the second position to allow the respective thicknesses of the first and second arms of the capstan holder to be received within the annular escapement to thereby hold the second capstan at the second position.

* * * * *